United States Patent
Kim

(10) Patent No.: US 11,710,026 B2
(45) Date of Patent: Jul. 25, 2023

(54) OPTIMIZATION FOR ARTIFICIAL NEURAL NETWORK MODEL AND NEURAL PROCESSING UNIT

(71) Applicant: DEEPX CO., LTD., Seongnam-si (KR)

(72) Inventor: Lok Won Kim, Seongnam-si (KR)

(73) Assignee: DEEPX CO., LTD., Seongnam-si (KR)

(*) Notice: Subject to any disclaimer, the term of this patent is extended or adjusted under 35 U.S.C. 154(b) by 0 days.

(21) Appl. No.: 17/989,761

(22) Filed: Nov. 18, 2022

(65) Prior Publication Data
US 2023/0090720 A1    Mar. 23, 2023

(30) Foreign Application Priority Data

Nov. 29, 2021   (KR) .................. 10-2021-0166868
Oct. 18, 2022   (KR) .................. 10-2022-0133807

(51) Int. Cl.
*G06N 3/02*          (2006.01)
*G06N 5/04*          (2023.01)

(52) U.S. Cl.
CPC ............. *G06N 3/02* (2013.01); *G06N 5/04* (2013.01)

(58) Field of Classification Search
None
See application file for complete search history.

(56) References Cited

U.S. PATENT DOCUMENTS

2020/0104715 A1* 4/2020 Denolf .................. G06N 3/006
2021/0303967 A1* 9/2021 Bender ................. G06N 3/08
2021/0350203 A1* 11/2021 Das ...................... G06N 3/04

FOREIGN PATENT DOCUMENTS

| CN | 112001491 A | 11/2020 |
| KR | 10-2020-0129666 A | 11/2020 |
| KR | 10-2021-0059623 A | 5/2021 |

OTHER PUBLICATIONS

Nayman ("HardCoRe-NAS: Hard Constrained differentiable Neural Architecture Search" Feb. 2021) (Year: 2021).*
Chen etal ("A Survey of Accelerator Architectures for Deep Neural Networks" 2020) (Year: 2020).*
Benmeziane et al. ("A Comprehensive Survey on Hardware-Aware Neural Architecture Search" Jan. 2021) (Year: 2021).*

* cited by examiner

*Primary Examiner* — Lut Wong
(74) *Attorney, Agent, or Firm* — Bridgeway IP Law Group, PLLC; Jihun Kim

(57) ABSTRACT

A computer-implemented apparatus installed and executed in a computer to search an optimal design of a neural processing unit (NPU), a hardware accelerator used for driving a computer-implemented artificial neural network (ANN) is disclosed. The NPU comprises a plurality of blocks connected in a form of pipeline, and the number of the plurality blocks and the number of the layers within each block of the plurality blocks are in need of optimization to reduce hardware resources demand and electricity power consumption of the ANN while maintaining the inference accuracy of the ANN at an acceptable level. The computer-implemented apparatus searches for and then outputs an optimal L value and an optimal C value when a first set of candidate values for a number of layers L and a second set of candidate values for a number of channels C per each layer of the ANN is provided.

20 Claims, 12 Drawing Sheets

Algorithm 1: Optimal uniform channel search for a given BNN model

Result: optimal_uniform_width
    procedure UNIFORM_WIDTH_SEARCH(*model, thresh, max_channel_size, layers*)
    *max_channel* ← *max_channel_size*;
        *min_channel* ← 0;
        *mid_channel* ← (*max_channel* − *min_channel*) /2;
        while *max_channel* − *min_channel* > 1 do
        *mid_channel* ←
    *floor* [(*max_channel* − *min_channel*)/2] + *min_channel*;
        for *k=1 to layers* do
            *model*[k].*channel_size* ← *mid_channel*;
        end
        *best_accuracy* ← 0 ;
        for *i=1 to 10* do
            *model* ← *train*(*model*) ;
            *acc* ← *test*(*model*) ;
            if *acc* > *best_accuracy* then
                *best_accuracy* ← *acc* ;
        end
        end
        if *best_acc* > *thresh* then
            *max_channel* ← *mid_channel* ;
            *optimal_uniform_width* = *mid_channel*
        else
            *min_channel* ← *mid_channel* ;
        end
    end

FIG. 6

Algorithm 2: Optimal width search for a given BNN model

Result: *optimal_channel_configuration*

```
procedure OPTIMAL_WIDTH_SEARCH(model, thresh, optimal_uniform_width, layers)
    for k=1 to layers do
        model[k].channel_size ← optimal_uniform_channel;
    end
    for k=1 to layers do
        max_channel ← uniform_channel_size;
        min_channel ← 0;
        for j=1 to layers do
            model[j].channel_size ← optimal_uniform_width;
        end
        while max_channel − min_channel > 1 do
            mid_channel ←
            floor[(max_channel − min_channel)/2] + min_channel;
            model[k].channel_size ← mid_channel; best_accuracy ← 0 ;
            for i=1 to 10 do
                model ← train(model) ;
                acc ← test(model) ;
                if acc >best_accuracy then
                    best_accuracy ← acc ;
                end
            end
            if best_acc >thresh then
                max_channel ← mid_channel ;
            else
                min_channel ← mid_channel ;
            end
        end
        optimal_channel_configuration[k] ← max_channel ;
    end
```

FIG. 7

Algorithm 3: Optimal BNN search based on optimal width configuration

```
Result: Optimal BNN
    procedure OPTIMAL_BNN_SEARCH(model, thresh, optimal_width_config, layers)
        for k=1 to Layers do
        model[k].channel_size ←
    min(optimal_width_config[k] + 2, optimal_uniform_width) ;
        end
        acc ← 0 ;
        while acc < thresh do
          for i=1 to 10 do
             model ← train(model) ;
             acc ← test(model) ;
             if acc >best_accuracy then
                 best_accuracy ← acc ;
             end
             if best_acc >thresh then
                 optimal_BNN ← model
             else
                 for k=1 to Layers do
                     channels ← model[k].channel_size ;
                     model[k].channel_size ←
                 min(channels + 1, optimal_uniform_width) ;
                 end
             end
          end
        end
```

FIG. 8

Algorithm 4: Deepbit Architecture search algorithm

Result: Optimal BNN models
    procedure DEEPBIT*(model, thresh, max_channel_size, L)*
        for *layers in L* do
        *optimal_uni_width ← uniform_width_search() ;*
        *optimal_channel_config ←*
    *optimal_width_search(optimal_uniform_width) ;*
        *optimal_bnns[layers] ←*
    *optimal_bnn_search(optimal_width_config, optimal_uni_width) ;*
        End

FIG. 9

OPTIMIZATION FOR ARTIFICIAL NEURAL NETWORK MODEL AND NEURAL PROCESSING UNIT

CROSS-REFERENCE TO RELATED APPLICATIONS

This application claims the priority of Korean Patent Application No. 10-2021-0166868 filed on Nov. 29, 2021 and Korean Patent Application No. 10-2022-0133807 filed on Oct. 18, 2022, in the Korean Intellectual Property Office, the disclosure of which is incorporated herein by reference.

BACKGROUND OF THE DISCLOSURE

Technical Field

The present disclosure relates to artificial neural networks.

Background Art

Humans are equipped with intelligence that can perform recognition, classification, inference, predict, and control/decision making. Artificial intelligence (AI) refers to artificially mimicking human intelligence.

The human brain is made up of numerous nerve cells called neurons. Each neuron is connected to hundreds to thousands of other neurons through connections called synapses. In order to imitate human intelligence, the modeling of the operating principle of biological neurons and the connection relationship between neurons is called an artificial neural network (ANN) model. That is, an ANN is a system that is usually implemented in either computer software, hardware, or both, and that connects computer implemented nodes that mimic neurons in a layer structure.

These artificial neural network models are divided into 'single-layer neural network' and 'multi-layer neural network' according to the number of layers therein. A typical multilayer neural network consists of an input layer, a hidden layer, and an output layer. (1) The input layer is a layer that receives external data (i.e., data external to the neural network), and the number of neurons in the input layer is the same as the number of input variables (i.e., each neuron in the input layer receives one input variable). (2) The hidden layer is located between the input layer and the output layer, receives a signal from the input layer, extracts characteristics, and transmits (the extracted characteristics) to the output layer. (3) The output layer receives the signal from the hidden layer and outputs it to the outside of the neural network. Within the hidden layer, the input signal between neurons is multiplied by each connection strength with a value between 0 and 1 and then summed and if this sum is greater than the threshold of the neuron, the neuron is activated and implemented as an output value through the activation function.

Meanwhile, in order to implement higher artificial intelligence, an increase in the number of hidden layers of an artificial neural network is called a deep neural network (DNN).

On the other hand, there are several types of DNNs, including convolutional neural networks (CNNs) are known to be prone to extract features of input data and identify patterns of features.

Convolutional neural networks (CNNs) are neural networks that function similar to image processing in the visual cortex of the human brain. Convolutional neural networks are known to be suitable for image processing.

However, since, due to the nature of a CNN, a very large amount of parameters, that is, floating point parameters, is required to extract features of input data, the demand for large memory of the computing system used for running the CNN is high and thus problematic. In order to solve this problem, a study on a low precision network that reduces the size of the input value or the parameter size of the layer of the neural network has been proposed and experimented.

As the result of the need and study of low precision networks, binarized neural network (BNN) has been proposed.

However, existing studies approached BNN only theoretically, and did not present an practically optimal BNN model running on hardware. In addition, existing studies did not suggest an optimal hardware structure that warrants an actual implementation.

SUMMARY OF THE DISCLOSURE

Accordingly, an aspect of the present disclosure is to present a method for finding an optimal BNN model running on hardware. In addition, an aspect of the present disclosure aims to present an optimal hardware architecture for implementing a BNN.

According to an example of the present disclosure, a computer-implemented apparatus (such as a software tool) installed and executed in a computer to search an optimal design of an artificial neural network (ANN) and a neural processing unit (NPU) for driving the ANN is disclosed. The computer-implemented apparatus may include a first operation unit configured to search for an optimal L value and an optimal C value when a first set of candidate values for a number of layers L and a second set of candidate values for a number of channels C per each layer of the ANN is provided; and a second operation unit configured to output the optimal L value and the optimal C value. When the NPU includes a plurality of blocks connected in a form of pipeline, a number of the plurality of blocks may be related to the optimal L value.

Each of the plurality of blocks may include at least one of a line buffer, a XNOR logic gate, a pop-count instruction execution unit, and a batch-normalization unit.

The first operation unit may be configured to search the optimal L value and the optimal C value based on at least one of a hardware cost of the NPU and a power consumption of the NPU.

The hardware cost of the NPU may be determined based on a number of flip-flops.

The first operation unit may be configured to search for the optimal L value and the optimal C value based on a required minimum inference accuracy. The optimal C value may be increased by one or two steps when inference accuracy degradation occurs.

The optimal C value may be a constant value that is the same in all layers of the ANN.

According to an example of the present disclosure, a computing system is disclosed. The computing system may include at least one processor; and at least one memory, operably electrically connected to the at least one processor, configured to store an instruction for a computer-implemented apparatus that searches an optimal design of an artificial neural network (ANN) and a neural processing unit (NPU) for operating the ANN. An operation, configured to be performed based on the instruction for the computer-implemented apparatus being executed by the at least one processor may comprise: searching an optimal L value and an optimal C value when a first set of candidate values for a number of layers L and a second set of candidate values for a number of channels C per each layer of the ANN is provided; and outputting the optimal L value and the optimal C value.

According to an example of the present disclosure, a non-transitory computer-readable storage medium storing instructions for a computer-implemented apparatus that searches an optimal design of an artificial neural network (ANN) and a neural processing unit (NPU) for driving the ANN is disclosed. The computer readable storage medium may be configured to store the instructions. The instructions, when executed by at least one processor, may cause the at least one processor to: search an optimal L value and an optimal C value when a first set of candidate values for a number of layers L and a second set of candidate values for a number of channels C per each layer of the ANN is provided; and output the optimal L value and the optimal C value. When the NPU includes a plurality of blocks connected in a form of pipeline, a number of the plurality of blocks may be related to the optimal L value.

According to an example of the present disclosure, a neural processing unit (NPU) configured to process an artificial neural network (ANN) is disclosed. The NPU may include a plurality of blocks. The plurality of blocks may be connected in a form of pipeline. Each of the plurality of blocks may include at least one of a line buffer, a XNOR logic gate, a pop-count instruction execution unit, and a batch-normalization unit. A number of the plurality of blocks may be equal to a number L of the plurality of layers in the ANN. The number L of the plurality of layers and a number C of channels per layer may be determined based on a power consumption and a hardware implementation cost.

According to the examples of the present disclosure, it is possible to design an optimal NPU with low hardware implementation cost and low power consumption while maintain the inference accuracy of the ANN within a pre-determined level.

BRIEF DESCRIPTION OF THE DRAWINGS

FIG. 6 shows algorithm 1 for searching an optimal uniform channel in a given BNN model.

FIG. 7 shows algorithm 2 for searching an optimal number of channels (i.e., optimal width) search in a given BNN model.

FIG. 8 shows algorithm 3 for searching an optimal BNN based on the optimal number of channels (i.e., optimal width configuration).

FIG. 9 shows the Deepbit architecture search algorithm 4.

DETAILED DESCRIPTION OF THE EMBODIMENT

Figure 1:
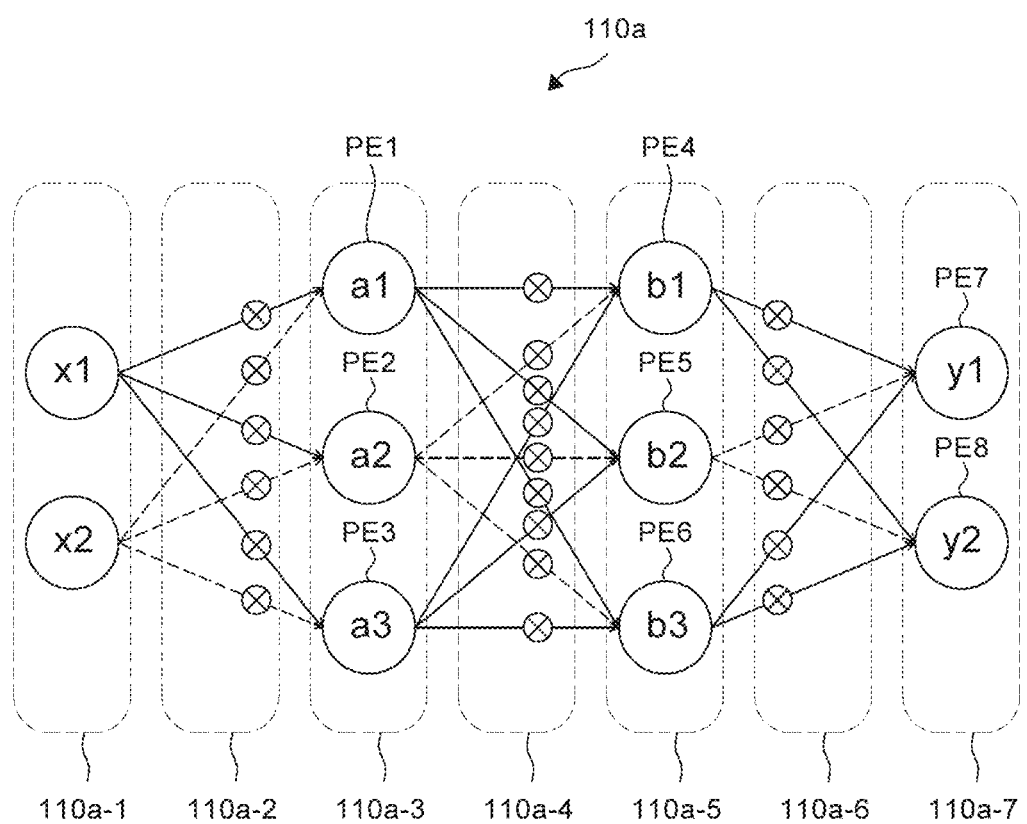
FIG. 1 is a schematic conceptual diagram illustrating an exemplary artificial neural network model.

Specific structural or step-by-step descriptions for the embodiments according to the concept of the present disclosure disclosed in the present specification or application are merely illustrative for the purpose of describing the embodiments according to the concept of the present disclosure. The examples according to the concept of the present disclosure may be carried out in various forms and are not interpreted to be limited to the examples described in the present specification or application.

Since the embodiment according to the concept of the present disclosure may have various changes and may have various forms, specific embodiments will be illustrated in the drawings and described in detail in the present disclosure or application. However, it should be understood that the examples according to the concept of the present disclosure is not limited to the specific examples, but includes all changes, equivalents, or alternatives which are included in the spirit and technical scope of the present disclosure.

Terminologies such as first and/or second may be used to describe various components but the components are not limited by the above terminologies. The above terminologies are used to distinguish one element from the other element, for example, a first element may be referred to as a second element without departing from a scope in accordance with the concept of the present disclosure and similarly, a second element may be referred to as a first element.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween. Other expressions which describe the relationship between components, for example, "between" or "directly between" or "adjacent to" and "directly adjacent to" should be interpreted in the same manner.

Terminologies used in the present disclosure are used only to describe specific examples, and are not intended to limit the present disclosure. A singular form may include a plural form if there is no clearly opposite meaning in the context. Accordingly, it should be understood that the possibility of addition or existence of one or more other features or numbers, steps, operations, components, parts, or combinations thereof is not precluded in advance.

If it is not contrarily defined, all terms used herein including technological or scientific terms have the same meaning as those generally understood by a person with ordinary skill in the art. Terminologies which are defined in a generally used dictionary should be interpreted to have the same meaning as the meaning in the context of the related art but are not interpreted as an ideally or excessively formal meaning if it is not clearly defined in the present disclosure.

When the examples are described, a technology which is well known in the technical field of the present disclosure and is not directly related to the present disclosure may be omitted. The reason is that unnecessary description is omitted to clearly transmit the gist of the present disclosure without obscuring the gist.

Definition of Terminologies

Here, in order to help the understanding of the disclosure proposed in the present specification, terminologies used in the present specification will be defined in brief.

NPU is an abbreviation for a neural processing unit (or an electronic apparatus) and refers to a processor specialized for an operation of an artificial neural network model separately from the central processing unit (CPU).

ANN is an abbreviation for a computer-implemented artificial neural network and refers to a network which connects nodes in a layered structure by imitating the connection of the neurons in the human brain through a synapse to imitate the human intelligence.

DNN is an abbreviation for a deep neural network and may mean that the number of hidden layers of the artificial neural network is increased to implement higher artificial intelligence.

CNN is an abbreviation for a convolutional neural network and is a neural network which functions similar to the image processing performed in a visual cortex of the human brain. The convolutional neural network is known to be appropriate for image processing and is known to be easy to extract features of input data and identify the pattern of the features.

Hereinafter, the present disclosure will be described in detail by describing preferred examples of the present disclosure with reference to the accompanying drawings. Hereinafter, examples of the present disclosure will be described in detail with reference to the accompanying drawings.

FIG. 1 is a schematic conceptual diagram illustrating a schematic artificial neural network model.

Hereinafter, the operation of the schematic artificial neural network model 110a that can be operated in the neural network processing unit ((not shown, but conventionally understood as a computing processing chip or a plurality of computing processing chips) will be described.

The shown artificial neural network model 110a of FIG. 1 may be an artificial neural network trained to perform various inference functions, such as object recognition and voice recognition.

The artificial neural network model 110a may be a deep neural network (DNN).

However, the artificial neural network model 110s according to examples of the present disclosure is not limited to a deep neural network.

For example, the artificial neural network model 110a may be implemented as a model such as Transformer, YOLO, BiseNet, RCNN, VGG, VGG16, DenseNet, SegNet, DeconvNet, DeepLAB V3+, U-net, SqueezeNet, Alexnet, ResNet18, MobileNet-v2, GoogLeNet, Resnet-v2, Resnet50, Resnet101, Inception-v3 and the like. However, the present disclosure is not limited to the above-described models. Also, the artificial neural network model 110a may be an ensemble model based on at least two different models.

Hereinafter, an inference process performed by the schematic artificial neural network model 110a will be described.

The artificial neural network model 110a may be a schematic deep neural network model including an input layer 110a-1, a first connection network 110a-2, a first hidden layer 110a-3, a second connection network 110a-4, a second hidden layer 110a-5, a third connection network 110a-6, and an output layer 110a-7. However, the present disclosure is certainly not limited only to the artificial neural network model illustrated in FIG. 1. The number of connection networks and the number of layers may vary from what is illustrated in FIG. 1. The first hidden layer 110a-3 and the second hidden layer 110a-5 may also be referred to as a plurality of hidden layers.

The input layer 110a-1 may schematically include input nodes x1 and x2. That is, the input layer 110a-1 may include information about two separate input values.

For example, the first connection network 110a-2 may include information about six weight values for connecting nodes of the input layer 110a-1 to nodes of the first hidden layer 110a-3, respectively. Each weight value is multiplied with the input node value, and an accumulated value of the multiplied values is stored in the first hidden layer 110a-3.

For example, the first hidden layer 110a-3 may include nodes a1, a2, and a3. That is, the first hidden layer 110a-3 may include information about three distinct node values, each of which is calculated independently.

For example, the second connection network 110a-4 may include information about nine weight values for connecting nodes of the first hidden layer 110a-3 to nodes of the second hidden layer 110a-5, respectively. The weight value of the second connection network 110a-4 is multiplied with the node value input from the corresponding first hidden layer 110a-3 and the accumulated value of the multiplied values is stored in the second hidden layer 110a-5.

For example, the second hidden layer 110a-5 may include nodes b1, b2, and b3. That is, the second hidden layer 110a-5 may include information about three distinct node values, each of which is calculated independently.

For example, the third connection network 110a-6 may include information about six weight values which connect nodes of the second hidden layer 110a-5 and nodes of the output layer 110a-7 (i.e., y1 and y2), respectively. The weight value of the third connection network 110a-6 is multiplied with the node value input from the second hidden layer 110a-5, and the accumulated value of the multiplied values is stored in the output layer 110a-7.

For example, the output layer 110a-7 may include nodes y1 and y2. That is, the output layer 110a-7 may include information about two distinct node values, each of which is calculated independently. It is noted that conventionally, all of the weight values in the connection networks 110a-2, 110a-4, and 110a-6 are initially assigned, and they, as explained later in this disclosure, are subjected to adjustment during the training of the neural network.

Figure 2A:
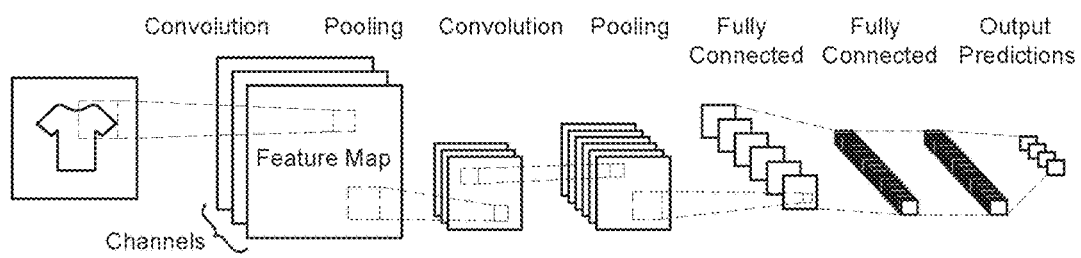
FIG. 2A is a schematic diagram showing a basic structure of a convolutional neural network (CNN).

FIG. 2A is a diagram showing a basic structure of a convolutional neural network (CNN).

Referring to FIG. 2A, an input image (of a T-shirt) may be displayed as a two-dimensional matrix including rows of a specific size and columns of a specific size. The input image may have a plurality of channels, where the channels collectively may represent the number of color components of the input data image.

The convolution process means performing a convolution operation with the kernel (i.e., a filer that is used for extract the features from the input image) while traversing the input image at a specified interval.

During the process, when the convolutional neural network proceeds from the current layer to the next layer, the weights between layers would be adjusted through the convolution.

For example, convolution can be defined by two main parameters: the size of the input image (typically a 1×1, 3×3 or 5×5 matrix) and the depth of the output feature map (i.e., the number of kernels) and these main parameters can be computed by convolution. These convolutions may start at depth 32, continue to depth 64, and end at depth 128 or 256.

Convolution can be executed by sliding these windows of size 3×3 or 5×5 over the 3D input feature map, stopping at every position, and extracting 3D patches of surrounding features.

Each of these 3D patches can be transformed into an 1D vector through tensor multiplication with the same learning weight matrix called weights. These vectors can be spatially reassembled into a 3D output map. All spatial locations of the output feature map may correspond to the same location of the input feature map.

A convolutional neural network may include a convolutional layer that performs a convolution operation between input data and a kernel (i.e., a weight matrix) that is learned over many iterations of gradient update during a learning process. If (m, n) is the kernel size and W is set as the weight value, the convolution layer can perform convolution of the input data and the weight matrix by calculating the dot product.

The step size that the kernel slides across the input data is called the stride length, and the kernel area (m×n) can be called the receptive field. The same convolutional kernel is applied across different locations of the input, which reduces the number of kernels learned. This also enables position invariant learning, where if a significant pattern is present in the input, the convolution filter can learn that pattern regardless of the position of the sequence.

A convolutional neural network can be tuned or trained so that input data leads to specific inference output. A convolutional neural network may be tuned using backpropagation based on comparisons between the inference output and the ground truth until the inference output progressively matches or approximates the ground truth.

A convolutional neural network can be trained by adjusting the weights between neurons based on the difference between the ground truth data and the actual output.

Figure 2B:
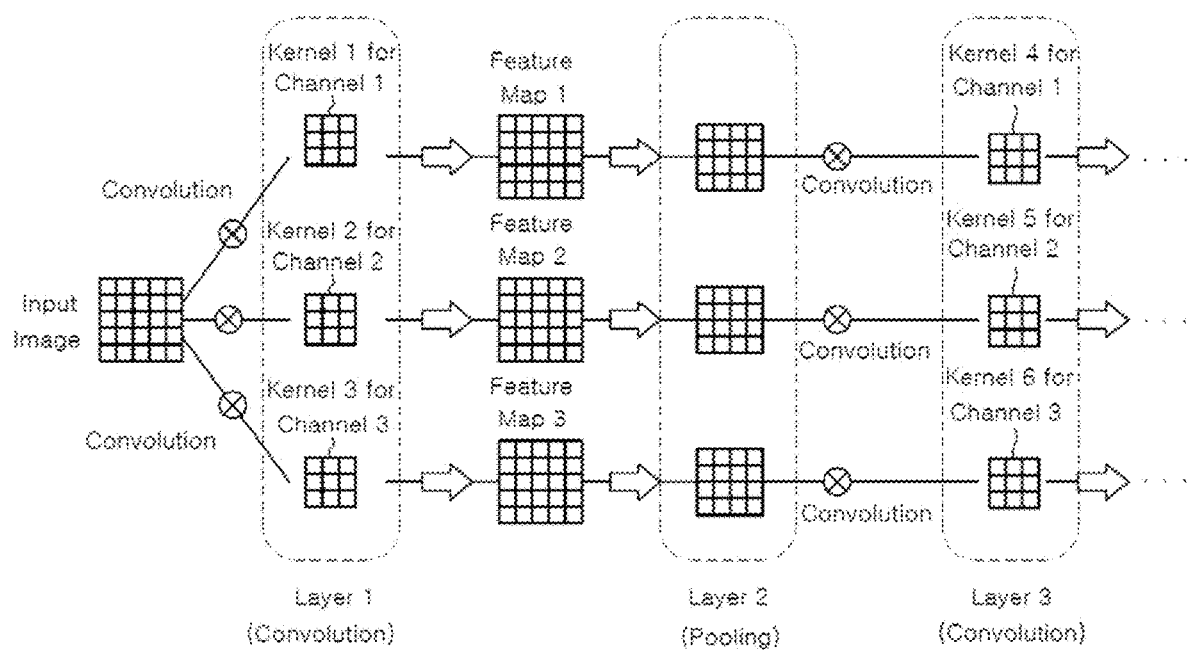
FIG. 2B is a schematic diagram showing the operation of the convolutional neural network illustratively.

FIG. 2B is a schematic diagram showing the operation of the convolutional neural network illustratively.

Referring to FIG. 2B, for example, an input image is shown as a two-dimensional matrix having a size of 5×5. In addition, FIG. 2B illustrates three nodes, i.e., channel 1, channel 2, and channel 3, are used by way of example.

At convolution layer 1, the convolution operations are independently conducted in the multiple channels, each of which processes one kernel.

The input image is convolved with kernels 1, 2, and 3 for channels 1, 2, and 3 at the first, second, and third node of layer 1 respectively, and as the result, feature maps 1, 2, and 3 are output respectively.

Similarly, at the pooling layer 2, the pooling operations are independently conducted in multiple channels, each of which processes one corresponding feature map.

Specifically, the feature map 1, the feature map 2, and the feature map 3 output from the layer 1 are input to the three nodes of the layer 2. Layer 2 may receive feature maps output from layer 1 as input and perform pooling. The pooling may reduce the size or emphasize a specific value in a matrix. Pooling methods include max-pooling, average pooling, and min-pooling. Max-pooling (i.e., maximum pooling) is used to collect the maximum values in a specific region of a matrix, and average pooling can be used to find the average within a specific region, and min-pooling (i.e., minimum pooling) can be used to select the minimum pixel value with a specific region of a matrix.

In the example of FIG. 2B, the size of the feature map of a 5×5 matrix is reduced to a 4×4 matrix by pooling.

Specifically, the first node of the layer 2 receives the feature map 1 for channel 1 as an input, performs pooling, and outputs it as, for example, a 4×4 matrix. The second node of layer 2 receives the feature map 2 for channel 2 as an input, performs pooling, and outputs, for example, a 4×4 matrix. The third node of layer 2 receives the feature map 3 for channel 3 as an input, performs pooling, and outputs it as a 4×4 matrix, for example.

Similarly, at the convolution layer 3, the convolution operations are independently conducted in multiple channels, each of which processes one kernel.

The first node of layer 3 receives the output from the first node of layer 2 as input, performs convolution with kernel 4, and outputs the result. The second node of layer 3 receives the output from the second node of layer 2 as an input, performs convolution with kernel 5 for channel 2, and outputs the result. Similarly, the third node of layer 3 receives the output from the third node of layer 2 as input, performs convolution with kernel 6 for channel 3, and outputs the result.

In this way, convolution and pooling are repeated, and finally, a fully connected layer may be output. The corresponding output may be input to an artificial neural network for image recognition again.

The CNN described so far is the most used method in the computer vision field among various deep neural network (DNN) methods. In particular, CNN has shown remarkable performance in various research areas performing various tasks such as image classification and object detection.

<Hardware Resources Required for CNN>

DNNs such as CNNs have been improved to have deeper and larger model sizes as the size of the data set becomes larger and the requirements are higher in order to be extended to various applications. This has resulted in heightened computation, memory resources and power consumption.

In particular, one of the disadvantages of performing CNN was that it had to compute a very large amount of floating-point numbers and required additional parameters for floating-point numbers. Therefore, the CNN operation is usually accelerated by using hardware devices such as a graphic processing unit (GPU). In particular, various deep learning development frameworks such as TensorFlow, ONNX, and PyTorch have appeared, and these frameworks allow users to easily accelerate computation using GPUs. However, GPUs have the disadvantage of consuming a lot of power, so they are not suitable for performing CNNs in small computing systems.

Therefore, research has been conducted to accelerate CNN using field programmable gate array (FPGA) or application specific integrated circuit (ASIC)-based hardware that consumes much less power but lower processing speed than GPU. ASIC-based accelerators typically outperform FPGA-based accelerators in terms of both performance and energy efficiency. The main reason is that ASIC can run at lower power consumption and faster clocks than FPGA.

On the other hand, the memory requirement of running a CNN remains high because it requires a very large number of parameters for the characteristics of CNN, that is, floating point calculations. In the case of AlexNet, a CNN structure that won the 2012 ImageNet recognition challenge, about 240 MB of parameters were required for floating point. This size of parameters is problematic as the size of parameters is not suitable for storage in the memory of a small computing system.

As described above, deep neural networks (DNNs) have increased accuracy by using many hardware resources (e.g., memory, computing power, and power).

However, for applications with resource-constrained embedded environments, it is very important to optimize the DNN model with respect to trimming energy and hardware resource demands to fit with the resource-constrained embedded environments <DNN Model Optimization Method>

Studies are underway to optimize the DNN model in terms of memory footprint and computation efficiency. Several studies have suggested various effective techniques for optimizing deep learning models. Among them, the pruning technique allows unnecessary weights to be removed from the neural network. The quantization technique can reduce the weight and the bit width of the activation map. Such techniques allow the creation of lighter and faster neural networks. Depending on the quantization technique, both the weight and the activation function can be reduced to 1-bit precision. Since the network uses only 1-bit weights and activation functions, computations can be very fast and lightweight. However, the reduction of the network scale has a disadvantage of losing accuracy of computation. Therefore, it is required to create a binary neural network model that can be implemented with the lowest power and resource efficiency and yet maintaining accuracy of computation.

<Binarized Neural Network (BNN)>

Among the studies of low precision networks, a binarized neural network (BNN) was emerged.

Binarized neural network (BNN) is an extreme structure even in the structure of a low precision neural network, in which the weight and the layer input value are binarized to +1/−1. That is, BNN is a neural network composed of 1-bit parameters. In BNN, the multiplication and accumulation (MAC) operation of CNN is simplified, and there is little difference in accuracy of the outcome from a CNN using floating point for low-complexity images (CIFAR-10, MNIST, SVHN).

BNN has an efficient structure for accelerated processing by less-power-consuming hardware. The biggest reason is that the size of memory required to load the existing parameters has been reduced by about 32 times, and as a result of the reduction, it is easy to load most of the parameters in on-chip RAM.

As such, since BNN does not require multiplication operation and memory usage is extremely reduced, hardware resources can be saved quite efficiently.

More specifically, BNN uses XNOR operation, a logical operation, to perform 1-bit operation. Multiplication can be implemented through XNOR operation, and cumulative addition can be implemented through the pop-count instruction, an operation to know the number of bits set to 1 in the register. Therefore, real number or integer multiplication and addition are not required, thereby increasing the operation speed. That is, since the operation unit is reduced from 32 bits to 1 bit, the theoretical memory bandwidth is increased by 32 folds.

Table 1 below is an example of an XNOR operation.

TABLE 1

| Input | | Output |
|---|---|---|
| A | B | a XNOR b |
| 0 | 0 | 1 |
| 0 | 1 | 0 |
| 1 | 0 | 0 |

TABLE 1-continued

| Input | | Output |
|---|---|---|
| 1 | 1 | 1 |

Cumulative addition after multiplication can be implemented by using the pop-count instruction. The pop-count command returns the number of bits set to 1 in the bit as shown in Table 2 below. Cumulative addition is possible by multiplying the result of pop-count instruction by 2 and subtracting the total number of bits.

TABLE 2

| 8-bit register a | 1011 0100 |
|---|---|
| 8-bit register b | 0110 1101 |
| a XNOR b | 0010 0110 |
| pop-count (a XNOR b) | 3 |
| 2 * pop-count (a XNOR b) − 8 | −2 |

After binarizing the parameters of the BNN as shown in the following equation, N multiplications can be accelerated through one XNOR logic operation by packing N parameters in N-bit registers.

$$\gamma_b = \begin{cases} +1, & \text{if } \gamma \geq 0, \\ -1, & \text{otherwise} \end{cases}$$ [Equation 1]

Above is the general concept of BNN described at the theoretical level. However, the theoretical concept of BNN leaves a lot of practical nuances to be ironed out to make BNN practically useful. Hereinafter, the system, device, and electronic apparatus disclosed as embodiments of materialized BNN will be described.

Examples of the Present Disclosure

I. Introduction

Recently, machine learning (ML) has become the most popular technology because it can be easily applied in various fields. In particular, DNN has been proven to have high accuracy and remarkable performance in performing classification tasks in computer vision and speech recognition fields.

For many applications that require higher accuracy while having large data sets, there is a tendency to study deep neural networks with more parameters and layers with larger model size. As DNNs become more complex, the memory demands for parameter storage also increase and require more computations, which greatly affects power and hardware resource efficiency.

In particular, in order to handle the increased number of operations, a larger number of logic gates are required in designs for implementation in FPGAs or ASICs, resulting in increased energy consumption while lowering processing performance. On the other hand, data required for most large DNNs may not be completely stored in an internal (on-chip) memory, and thus an external memory (e.g., off-chip DRAM) must be frequently accessed. Such access to external memories consumes considerably more electricity energy and degrades computational performance.

Among recent studies, optimization methods for improving DNN performance have been suggested, and one of these various optimization methods is a method of reducing the calculation precision for potentially redundant information. In this method, since all parameters are binarized, the size of needed memory can be reduced in a large degree, and since the multiplication operation is replaced with the XNOR function, the size of the operation can be reduced as well, and thus energy consumption can be accordingly reduced in a large degree. However, binarizing all parameter and feature map values has the disadvantage of reducing computational accuracy.

Unlike aforementioned optimization method, the binary neural network (BNN) can reduce electricity power consumption and require less hardware resources, and it thus can show promising results. However, because it uses a small number of parameters, a decrease in accuracy is unavoidable.

Therefore, it is important to strike a balance between implementation cost (in terms of electricity power consumption and hardware resources demands) and computational accuracy. To this end, it is required to design a special hardware accelerator that can maximize the advantages of a binary neural network (BNN), with the aid from optimization facilitated by software (i.e., binary neural networks (BNN) can be optimized in software). However, due to the wide range of hardware available today, an independent evaluation of the software network architecture is not sufficient to determine the final network model.

Therefore, the example of the present disclosure proposes an architecture search algorithm based on the hardware performance estimation at the design time to achieve the best binary neural network model for hardware implementation in the target platform.

In addition, the example of the present disclosure proposes an efficient method that can increase computational accuracy of floating-point operation (FLOP) or multiply-accumulate (MAC) operation by utilizing an XNOR-net-based architecture and a target platform including field programmable gate array (FPGA), graphic processing unit (GPU), and resistive random access memory (RRAM).

To achieve the optimization goal at the software level, the study of special accelerators for specific software neural network models has been proposed. In addition, studies have been conducted to minimize the number of parameters and computing power based on generalized metrics such as MAC operation. These studies effectively reduced the evaluation time in the simple first-order tuning process and made it possible to quickly look into the hardware overhead when implementing the neural network.

However, conventional research does not sufficiently provide data or information necessary for a detailed tuning process for a specific target hardware. It also has the disadvantage of making bad decisions due to its inherent properties when choosing a relevant model to implement.

More specifically, even if the network design is the same, the cost may be calculated differently for each hardware platform. In addition, when the BNN model is implemented on a GPU platform or on a custom hardware platform such as an FPGA or ASIC, the hardware platform can provide various hardware tasks that are optimized according to the cost. Accordingly, the optimal model configuration may vary greatly to be accustomed to the hardware platform the model is running on. Therefore, it is difficult to measure hardware performance at the time of design, and finding the best neural network model for the hardware platform is very demanding.

In the present disclosure, in order to design an optimal BNN specifically for a hardware platform, a new framework for estimating hardware performance and analyzing and exploring an ultimate software model based on architecture exploration for a training period is proposed. Specifically, the method presented in the present disclosure is performed through the following processes.

Process before training: a cost estimation chart is developed before training. A cost estimate chart can be developed by deploying various models on the target hardware and calculating the actual cost.

Training process: a Deepbit method can be facilitated to explore a wide hyperspace and provide a series of efficient BNN models with a variable depth.

Post-training process: finally, network performance can be predicted on a real hardware using cost estimation charts. The most efficient network can be selected based on the prediction.

In the present disclosure, FPGA, GPU, and RRAM are the target hardware platforms and the MNIST data set (Modified National Institute of Standards and Technology data set) can be used for training to prove the effectiveness of the method presented in this disclosure.

Although the method presented in the present disclosure increases the amount of computation in the training process, the method presented in the present disclosure may provide an accurate metric for DNN model architecture search. Training is performed on the GPU server, which is a resource-rich environment in terms of computing capability, power, and temperature. Accordingly, if an efficient network can be derived for target hardware to be developed as an embedded environment, it may be advantageous and worthwhile to increase the amount of computation in the training time.

Hereinafter, in Section II, various contents related to the method presented in the present disclosure will be described. Section III describes the basic design strategies used in networks to reduce the search space. Section IV describes the proposed method for developing cost estimation charts. Section V describes architecture exploration using the Deepbit method. Section IV presents the experimental results.

II. Various Contents Related to the Method Presented in the Present Disclosure

II-1. Binarized Neural Network (BNN) Optimization

BNN optimization for hardware implementation can be divided into several categories. In the first category, hardware techniques can be proposed to reduce the hardware cost of available software neural networks. For example, max-pooling is replaced with an OR operation taking the advantages of binary properties. In addition, the hardware overhead and power consumption of the binary convolution layer can be reduced by using the matrix-vector-threshold unit (MVTU), which is a threshold for batch-normalization. In addition, it may be proposed to use the difference between the binary weight arrays to reduce the computational amount in both the binary convolutional layer and the fully connected layer. Pop-count compression and XNOR-based binary MAC operation can be applied to reduce the consumption of hardware resources by the BNN model. For in-memory computing (IMC), a mixed-signal IMC SRAM macro can be proposed that can compute ternary XNOR-and-accumulate (XAC) operations in binary neural networks without row-by-row data access. Here, the ternary XAC may use a trinary digit method. This technology can provide better energy efficiency than conventional digital hardware. RRAM can also be utilized in a synaptic architecture (XNOR-RRAM) that can implement equivalent XNOR and bit counting operations. These techniques, collectively, make it possible to effectively optimize the BNN by evaluating the feedback directly from the hardware implementation results. Any compatible hardware technology can be used flexibly to optimize the design without affecting the software function of the BNN. However, focusing only on hardware optimization may not be a comprehensive optimization for all neural networks. It may be software optimization that can provide an optimal architecture for a particular target hardware platform with unique advantages.

Accordingly, the second category of BNN optimization may be software optimization. Most methods in this category are independent optimizations of software models based on generalized metrics such as accuracy, floating-point operations (FLOPs), and MAC operations. For example, in order to estimate the performance of a network, an architectural neural network search using reinforcement learning can be proposed to search for an optimal neural network model based on accuracy and training time. Transferable Architectures can reduce the search space for large datasets based on the training results of small datasets. FLOP and accuracy criteria can also be used for comparison to evaluate the effectiveness of a solution. In addition, recent DNN models can reduce the number of parameters or MAC tasks while providing high accuracy by using techniques such as skip-connection, depth-wise separable convolution, squeeze and excitation, inverted-bottleneck, leaky-ReLU (Rectified Linear Unit), and the like.

The third category of BNN optimization is to optimize software models based on feedback from hardware implementation results. The inference performance of the DNN model can be considered. Previously, only one type of hardware platform was considered: the ARM architecture for mobile devices. However, recently, direct metrics for various mobile CPUs are also used. In order to evaluate the efficiency of an optimal neural network, latency can be greatly considered when implementing on a mobile platform. Furthermore, a hardware simulator can be built that generates the latency and energy signature of a variety of hardware platforms for the reinforcement learning process to automatically determine the policy for quantization for each layer of a particular neural network. Taking into account the model delay that measures the actual time delay of a mobile device, an automated mobile neural architecture search can be built.

In addition, the search can identify models that strike a desirable balance between accuracy and latency. However, it should be taken into account that different smart devices have a variety of hardware such as GPUs, CPUs, FPGAs, ReRams, DSPs, and AI accelerators such as Google's TPU, Intel's Movidius, and Nvidia's Jetson. All of these devices may have different hardware designs and operating characteristics. This allows the same network architecture to operate with different operating characteristics (latency, throughput, power consumption, heat, and the like). Therefore, it may not be optimal to run the network architecture recursively on the target hardware to ensure that hardware performance of a different hardware platform is also taken into account during the design process. In general, since the hardware platform on which the training of the model is conducted may not be the same as the target hardware, it may take a substantial amount of time during iteration including training and hardware feedback.

In consideration of the limitations of these existing systems, the present disclosure proposes a new approach. Based on the proposed method and hardware platform type before training and optimizing the target network architecture, the present disclosure presents an improved cost estimation chart. According to an example of the present disclosure, a much more accurate estimate of hardware performance may be provided compared to a typical FLOP or MAC operation.

II-2. Theoretical Background of BNN

BNN has lately received a lot of attention due to its hardware-friendly nature. With only two states for weight and activation, BNN can dramatically increase performance by reducing memory usage and the number of computations. BNN is the kind of artificial neural network in which weights and active outputs are limited to positive and negative values, i.e., −1 and +1. To convert real variables into these two polarized values, two different binarizing functions can be used. First, the deterministic function is as follows:

$$x^b = \text{Sign}(x) = \begin{cases} +1, \text{ if } x \geq 0 \\ -1, \text{ otherwise} \end{cases} \quad \text{[Equation 2]}$$

where $x^b$ is the output of the function after binarization. Second, the stochastic function is as follows:

$$x^b = \text{Sign}(x) = \begin{cases} +1, \text{ with probability } \rho = \sigma(x) \\ -1, \text{ with probability } 1-\rho \end{cases} \quad \text{[Equation 3]}$$

Here, $\sigma(x) = \max(0; \min(1, (x+1)/2))$. While deterministic functions are used for actual hardware implementations, probabilistic functions are also used.

Figure 3:
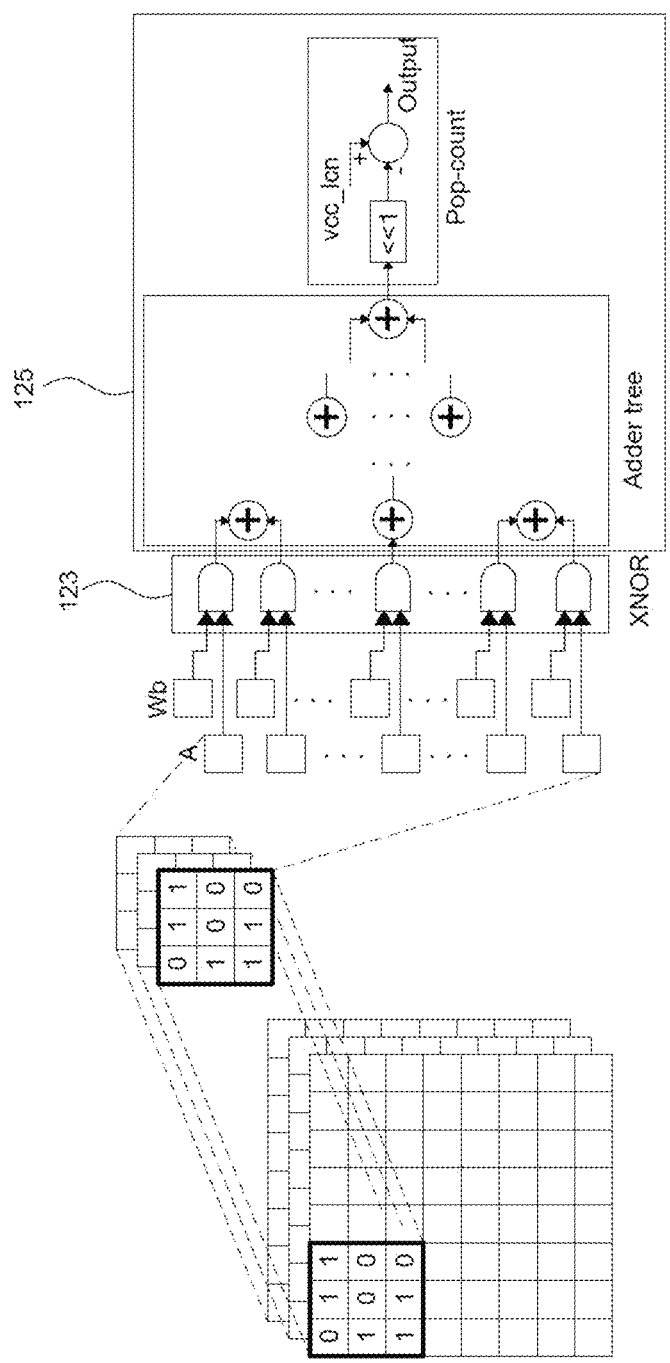
FIG. 3 is a schematic diagram illustrating a structure for performing an XNOR operation and an accumulation operation in a convolutional layer of a CNN.

Based on the above characteristics, in BNN, as shown in FIG. 3, the multiplication operation of the convolution and fully connected layer can be simplified with a simple XNOR operation, and the accumulation operation can be replaced with a pop-count operation without degrading computational accuracy. In addition, compared to the weight and activation of 32 bits, the weight and activation can be reduced by almost 32 times because the weight and activation are expressed with only one bit. As a result, the power consumption for memory access can be significantly reduced compared to the conventional convolutional or fully connected layer.

FIG. 3 is aa schematic diagram illustrating a structure for performing an XNOR operation and an accumulation operation in a convolutional layer.

Since BNN uses a binarizing function, all weights and outputs for the convolutional layer and the fully connected layer are reduced to one bit before being used for the next operation.

Accordingly, all multiplication operations that consume a lot of hardware resources can be replaced with a much simpler and resource-less-demanding XNOR logic gate 123 as shown in FIG. 3. The adder tree 125 used for the next process, accumulation, includes a pop-count performing unit, so that its structure can be made much simpler.

In addition, since the MAC (i.e., multiply-accumulate) operation was a major factor in overloading the neural network, BNN performance can be improved by using batch-normalization and max-pooling. The techniques applied to each type of operation are as follows.

a. Batch-Normalization and Binarization in BNN

Unlike MAC operations, batch-normalization functions use floating-point parameters and operations such as division, root-square, and multiplication. In general, the batch-normalized value of X can be calculated as follows:

$$Y = \frac{X - \mu}{\sqrt{\text{var} + \varepsilon}} \gamma + \beta \qquad \text{[Equation 4]}$$

where ε is a small number to avoid round-off problems.

μ and var represent the mean, and γ and β, variables of the training data, are constants obtained during the learning process.

This normalized value Y can be binarized as follows:

$$Z = \begin{cases} 1, & \text{if } Y \geq 0 \\ 0, & \text{if } Y \leq 0 \end{cases}; \qquad \text{[Equation 5]}$$

The two steps including normalization and binarization can be combined into one through a simpler threshold comparison process as shown in the following equation.

$$\text{sign}(\gamma) = \begin{cases} 1 & \text{if } \gamma > 0 \\ 0 & \text{if } \gamma < 0 \end{cases} \qquad \text{[Equation 6]}$$

If $$\text{sign}(\gamma) = \begin{cases} 1 & \text{if } \gamma > 0 \\ 0 & \text{if } \gamma < 0 \end{cases}$$

then, the following equation can be used.

$$Z = (X \geq (\frac{-\beta\sqrt{\text{var} + \varepsilon}}{\gamma} + \mu)XNOR\text{sign}(\gamma) \qquad \text{[Equation 7]}$$

Furthermore, the combination of batch-normalization and binarization in a hardware implementation results in the output of a comparator and successive XNOR gates.

b. Max-Pooling Operation in BNN

In BNN, after batch-normalization operation, some layers may use max-pooling to reduce activation of input for successive layers. Theoretically, the output of the max-pooling operation can be binarized before being passed to the next layer. By exchanging the binarization module and the max-pooling module with each other, the batch-normalization and the binary function can be combined and output the result Z. In addition, calculating the maximum values of a binary window is equivalent to taking a binary value as input and finding the output of an OR operation.

The present disclosure presents a method for utilizing BNN on a resource-constrained hardware platform. Since the input pixels of the first layer of the BNN may not be binarized, it is possible to search for a BNN that is explicitly optimized for the target hardware by performing an architecture search algorithm that can estimate hardware performance at design time. In the following section III, the design strategy of BNN will be described in detail. It also describes architecture discovery algorithms and hardware cost estimation at design time.

III. Basic Design Strategies

DNN model architecture search consumes considerable resources to compute because the search space is infinitely large. Accordingly, the present disclosure proposes a method of reducing the search space by defining some basic design principles. Accordingly, the search space can be effectively narrowed, and the computational complexity of architecture search can be significantly reduced. In general, in the present disclosure, the experimental results using the MNIST dataset and the binarized neural network (BNN) are presented.

According to an embodiment of the present disclosure, all weights and activation maps may be binarized except for the input pixel of the first convolutional layer. Also, according to the embodiment of the present disclosure, in order to find an efficient network architecture for a neural network supporting an image classification task, it is proposed to adjust only the convolutional layer while maintaining one fully connected layer at the end of the neural network.

Meanwhile, in order to further reduce the amount of computation, a pooling technique, well known as a basic design strategy, may also be added to the experimental neural network. As mentioned in Section I, the number of MAC operations is not a criterion for determining the ultimate implementation model, but it can help narrow the search space in a simple tuning step.

Table 3 below shows the additional effect of the pooling layer, and Table 4 shows the difference between the max-pooling and the average pooling. Adding up to two pooling layers for the last two convolutions can significantly reduce MAC operations by 38% with 0.1% accuracy degradation, a slight and neglectable reduction on accuracy. On the other hand, adding one pooling layer can slightly reduce the number of MAC operations. Therefore, in the present disclosure, the architecture search algorithm has chosen to use two pooling layers. Also, the type of pooling layer may be considered for the search space.

TABLE 3

| Pooling Layers (#) | Channels per Layers (#) | Accuracy (%) | MAC Operations |
|---|---|---|---|
| 0 | 32 | 98.54 | 29352960 |
| 1 | 32 | 98.48 | 28976640 |
| 2 | 32 | 98.44 | 18063360 |

TABLE 4

| Type of pooling | Channels per Layers (#) | Accuracy (%) |
|---|---|---|
| Average | 32 | 98.35 |
| Max | 32 | 98.44 |

Table 4 compares the accuracy of the model using only the max-pooling layer and the model using the average pooling layer. It can be seen that the max-pooling exhibits higher accuracy than the average pooling.

According to the present disclosure, the search space can only consider a standard convolutional layer with a 3×3 kernel size suitable to provide high accuracy for the MNIST data set. Meanwhile, in order to avoid heavy memory access and reduce the search time and complexity of the search algorithm, point-wise, depth-wise convolution, residual neural networks, and kernel sizes larger than 3×3 may not be considered in the search space. However, the present disclosure does not exclude point-wise, depth-wise convolution, residual neural networks, and factors of a kernel size greater than 3×3. Regarding the activation function, a batch-normalized hard-Tan h activation function can be applied to each convolutional layer. The basic modules of the architecture are described in Section II. Depending on design considerations, the number of layers and the number of channels may be adjusted to find an optimal architecture. Depending on the learning resource, the design strategy may vary. The present disclosure attempts to optimize 6 models in terms of channels per layer according to a design strategy, and each model may have a depth (i.e., number of layers) between 3 and 8. Given more training resources, a total of 12 models are obtained, namely 6 models with max-pooling in the last two layers and 6 models with average pooling in the last two layers.

IV. Hardware Cost Estimation

In this section, the methods used to develop cost estimation charts are presented. As mentioned in the previous section, in order to find the best neural network model for a target hardware implementation based on the design strategy, the architecture search algorithm can only perform a role of identifying the appropriate depth (the number of layers, i.e., L) of the network, the number of channels of each layer (i.e., C), and the layers (i.e., the number of channels). As a result, ranges for the network depth (i.e., the number of layers) and the number of channels may need to be prepared in order to develop a cost estimation chart for the search algorithm. In particular, the range of the number of network channels may be defined as a range from 5 to 50, an interval may be defined as 5, and the network depth (i.e., the number of layers) may be defined as a range from 3 to 10, as follows.

Number of layers L, that is, depth=3, 4, 5, 6, 7, 8, 9, 10
Number of channels C, that is. width=5, 10, 15, 20, 25, 30, 35, 40, 45, 50

Figure 4A:
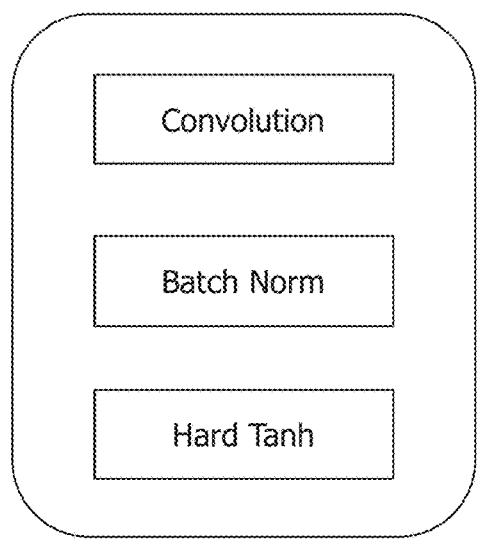
FIGS. 4A and 4B show a creation module of the network architecture respectively.
Figure 4B:
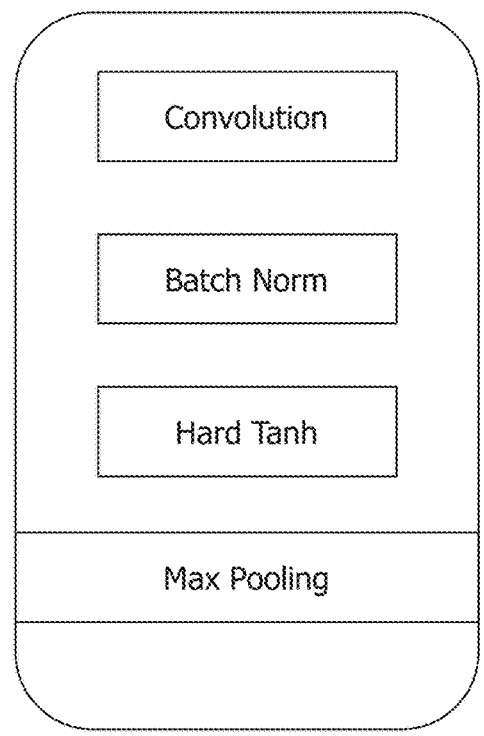

FIGS. 4A and 4B show the creation module of the network architecture.

Specifically, FIG. 4A shows a layer module for a network architecture presented in the present disclosure, and FIG. 4B shows a layer module for a network architecture with max-pooling.

Table 5 below shows a cost estimation chart for power consumption.

TABLE 5

| | 3 | 4 | 5 | 6 | 7 | 8 | 9 | 10 | ↑ |
|---|---|---|---|---|---|---|---|---|---|
| 10 | | | | 0.611 | 0.676 | 0.74 | 0.791 | 0.836 | ↑ |
| 15 | | 0.721 | 0.877 | 0.985 | 1.127 | 1.26 | 1.422 | 1.561 | Channel |
| 20 | 0.77 | 1.053 | 1.281 | 1.494 | 1.718 | 1.983 | 2.251 | 2.499 | (C) |
| 25 | 0.966 | 1.117 | 1.692 | 2.143 | 2.525 | | | | ↓ |
| 30 | 1.429 | 2.079 | | | | | | | ↓ |
| | | | ← Layer (L) → | | | | | | |

The values in the table above are in watts.

Figure 5A:
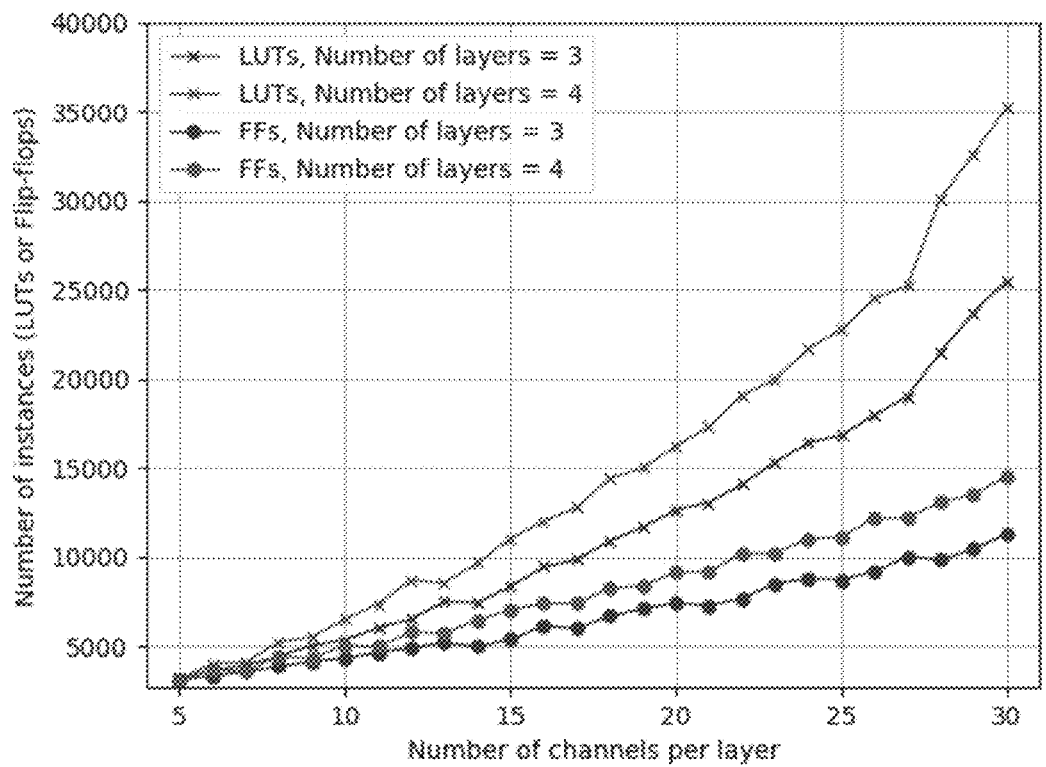
FIGS. 5A and 5B show hardware and power cost estimates for a list of BNN models with different L and C values on an FPGA.
Figure 5B:
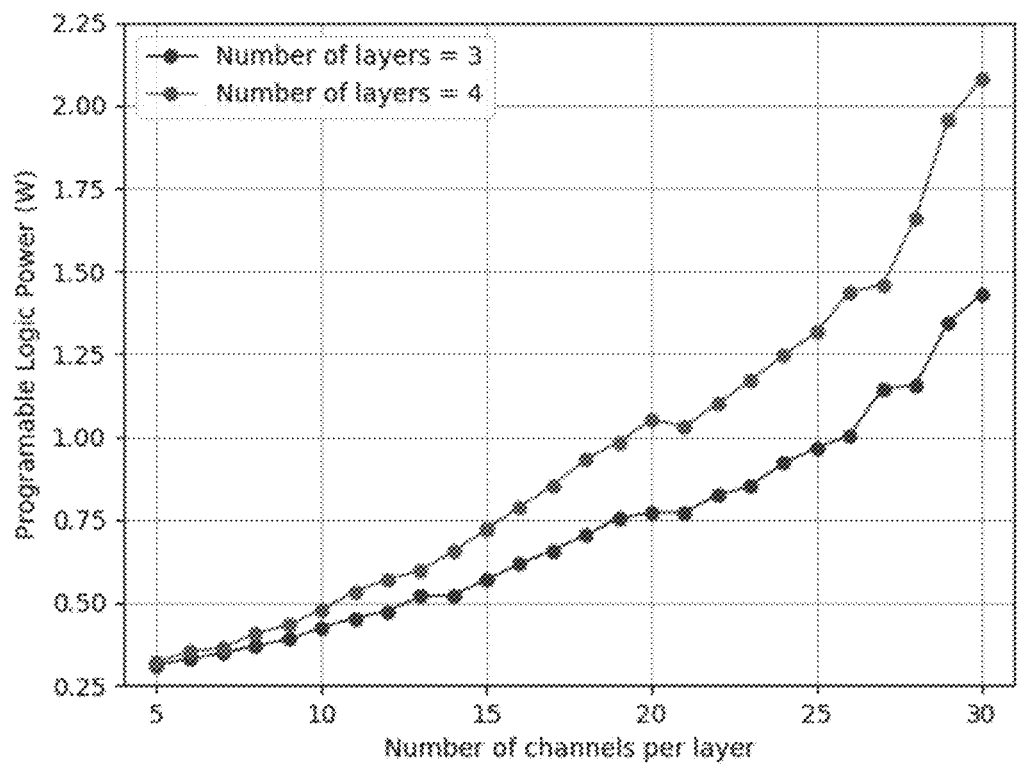

Based on the above range, L×C BNN models given by the Cartesian product of the set layer L and the set channel C as shown in Table 5 above may be provided for hardware evaluation and learning process. Here, L is the number of convolutional layers, and C is the number of channels in each layer. More specifically, all models can be initialized by random weights and deployed on a target hardware platform to find out the actual hardware cost. Depending on the target hardware platform, the cost metric may be obtained from other criteria, but may represent the most significant resource of the corresponding target hardware. However, in FPGAs, power consumption, LUT (Look Up Table) and flip-flop may be conditions used for cost metric. Based on these costs, a hardware cost estimate may be performed during the search time to find the best software model for each corresponding accuracy. This can reduce the degree of rigorous hardware testing after training the optimal model. A cost estimate chart needs to be developed for each specific hardware platform. The only condition is that the search space for the architecture search must be part of the search space of the cost estimate chart. FIGS. 5A and 5B and Table 5 may be exemplary charts for power consumption of the BNN model.

FIGS. 5A and 5B show hardware and power cost estimates for a list of BNN models with different L and C values on an FPGA.

Specifically, FIG. 5A shows the hardware implementation cost for a list of BNN models with different L and C values on the FPGA. Referring to FIG. 5A, when the number of layers is 3, if the number of channels per layer increases, the number of LUTs or the number of flip-flops increases, and as a result, it can be seen that the hardware implementation cost increases. Similarly, even when the number of layers is 4, it can be seen that if the number of channels per layer is increased, the number of LUTs or the number of flip-flops increases, resulting in an increase in hardware implementation cost. Also, it can be seen that the hardware implementation cost is higher when the number of layers is 4 compared to the hardware implementation cost when the number of layers is 3.

FIG. 5B shows the power consumption for a list of BNN models with different L and C values on the FPGA. Referring to FIG. 5B, when the number of layers is 3, it can be seen that when the number of channels per layer is increased, power consumption is increased. Similarly, in case of when the number of layers is 4, it can be seen that when the number of channels per layer is increased, power consumption is increased. In addition, it can be seen that power consumption is greater when the number of layers is 4 compared to power consumption when the number of layers is 3.

V. Architecture Exploration with DeepBit

In order to search for the optimal BNN architecture for the corresponding hardware platform, in this section, an architecture search algorithm named DeepBit will be described. The input to the architecture search algorithm called DeepBit is as follows.

1. Define the range for the depth of the BNN model (that is, the number of convolutional layers) as a set L as follows.
   set L={3, 4, 5, 6, 7, 8}
2. The maximum number of uniform channels per layer may be set to 50, according to an example.
3. The threshold for an acceptable model may generally be a threshold for an acceptable minimum accuracy.

The output of the algorithm may be a series of models. Each model may be an optimal BNN model with a minimum number of channels per layer, and the number of layers may be a corresponding value in the L input set. Thus, the number of output models may be equal to the size of the set L.

The DeepBit algorithm may include three steps.
The algorithm for the first step is shown in FIG. 6, the algorithm for the second step is shown in FIG. 7, and the algorithm for the third step is shown in FIG. 8.

FIG. 6 shows algorithm 1 for optimal uniform channel search in a given BNN model.

In the first step, for any given model, the number of output channels C (i.e., width) in each convolutional layer of the network can be reduced uniformly for each layer. In other words, for a given model, the number of channels in the network can exist as a constant in all layers. The first step may be initiated by defining a model with a depth (i.e., number of layers) that has a value equal to the minimum value in the set L. The number of channels in the network may be defined by the above-mentioned second input (i.e., 50 as an example). A binary search algorithm searches for a BNN model having the minimum number of uniform channels matching the minimum accuracy threshold defined as the third input.

FIG. 7 shows algorithm 2 for searching for the optimal number of channels in a given BNN model.

In the second step, a search may be performed to find the optimal number of channels C for each layer. This second step can be performed on the output of the first step. In this second step, according to an embodiment, the number of channels in the network may be reduced according to the maximum number of channels in the network found in the first step. Binary search may be used once again to find the optimal number of channels for the first layer, and the number of channels for other layers may be set to a constant with respect to the optimal uniform number of channels. Once the optimal number of channels for the first layer is found, the same process may be performed to find the optimal number of channels for each of the remaining layers. In the process of searching for a general layer, the number of channels of each of the remaining layers needs to be maintained as an initial value. The values of the optimal number of channels for all convolutional layers can be stored and reused for the next step.

FIG. 8 shows algorithm 3 for optimal BNN search based on the optimal number of channels (i.e., optimal width configuration).

In the third step, which is the last step of the search algorithm, the value of the optimal number of channels of each layer transmitted from the second step may be used to define an optimal BNN model. Since the number of channels of all layers is set to be uniform while the number of optimal channels of a specific layer is searched, a decrease in accuracy may be expected when combining all the optimal numbers of channels of each layer. In order to compensate for the decrease in accuracy, the number of channels in each layer may be increased by two or more channels for each layer. If the number of channels in any layer is greater than the initial value in the first step, instead of adding two channels to the optimal value, the initial number of channels may be kept for this layer. Next, a training process may be performed on a new BNN model having the adjusted number of channels. If the accuracy matches the threshold, the model can be selected as the best BNN model with a given initial depth (i.e., number of layers). If the accuracy is less than the threshold, the number of channels in each layer may be increased by one, and the model may be retrained to check whether the accuracy is improved. This process can be repeated until an optimal model with accuracy matching the threshold value is found, or until the number of channels in any layer is equal to the value of the initial uniform channel number in the first step. This applies for all depth (i.e., number of layers) values in set L. As a result, a series of BNN models and variable depth (i.e., the number of layers) having the optimal channel number setting can be generated. Accordingly, a network having a depth of 3 to 8 (i.e., the number of layers) may be created.

FIG. 9 shows the DeepBit architecture search algorithm 4.

Finally, in order to find the most hardware-suitable model based on the set of optimal BNN models obtained from the above-mentioned third step, the target hardware cost for each model can be estimated according to the hardware cost estimation method described in section IV. In general, in the hardware cost chart, all models use a uniform number of channels to represent the number of channels per layer. This means that the number of channels per layer is equal to the number of uniform channels in the model. Moreover, in order to evaluate the hardware cost for the optimal model, the average number of channels per layer can play the same role as the number of optimal channels in the model, and the average number of channels per layer can be used to find an optimal model based on a hardware estimation chart. Since the estimation chart does not show all the hardware costs for all the optimal number of channels, a linear regression method can be additionally used to estimate the hardware cost for each model. When two or more models have the same average number of channels per layer during the search process, a corresponding hardware design can be implemented to accurately evaluate. After the whole process, the BNN model with the minimum hardware cost can be selected. The DeepBit architecture search algorithm is shown in FIG. 9.

VI. Experiment Result

This section describes the results of experiments to prove the effectiveness of the proposed method. In order to find the optimal BNN architecture based on the proposed method, GPU, RRAM, and FPGA can be used as target platforms. Depending on the type of target platform, corresponding hardware cost estimates can be prepared for hardware resources that make a difference in the cost estimation.

Figure 10:
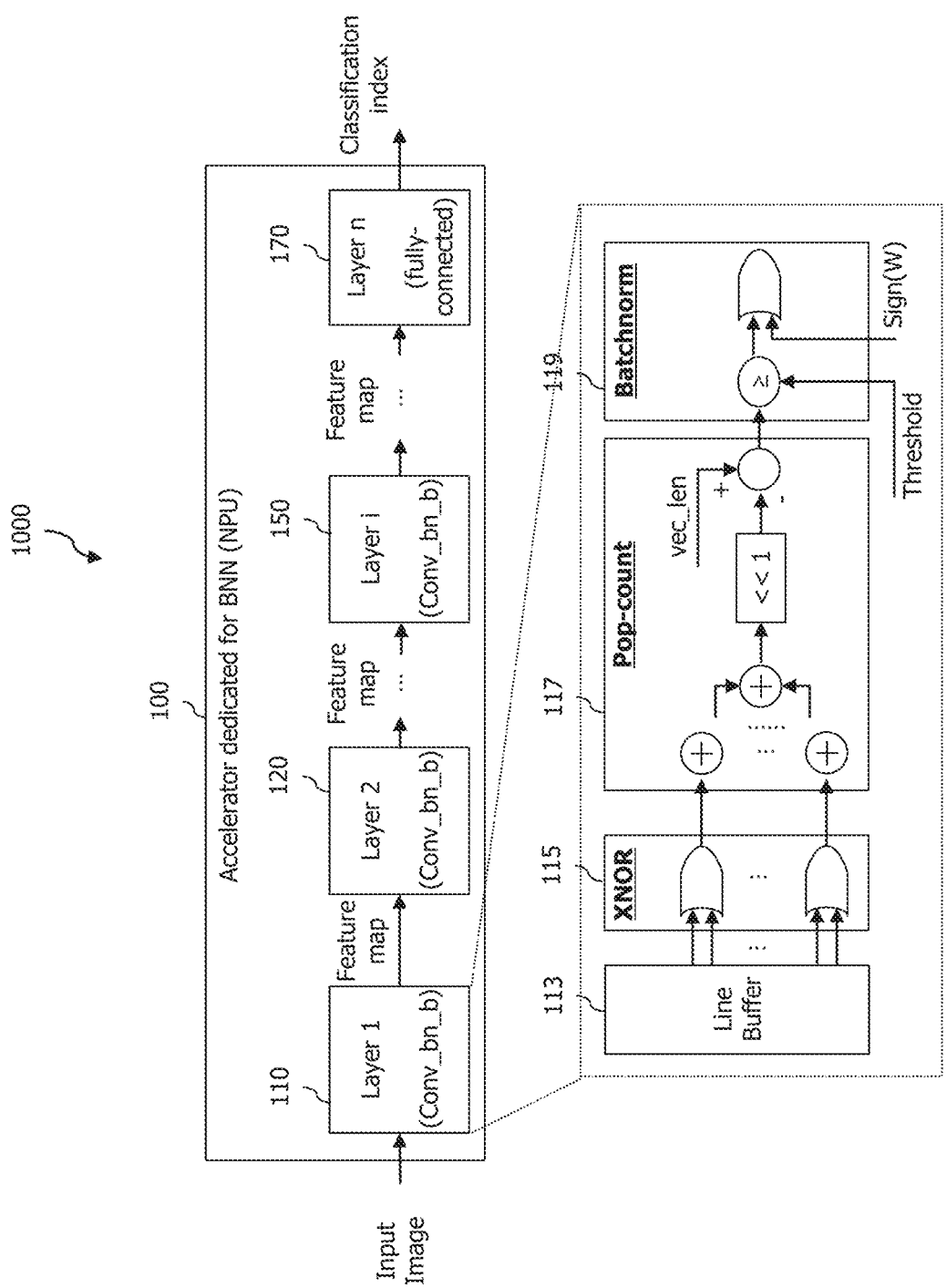
FIG. 10 is a schematic block diagram illustrating a BNN hardware architecture using an FPGA.

FIG. 10 is a block diagram illustrating a BNN hardware architecture using an FPGA.

As shown in FIG. 10, the BNN hardware architecture 1000 may include a dedicated BNN accelerator (i.e., a dedicated BNN NPU) 100.

The dedicated BNN accelerator (i.e., dedicated BNN NPU) 100 may include a first block 110 for the first layer, a second block 120 for the second layer, a third block 150 for the $i^{th}$ layer, and a fourth block 170 for the $n^{th}$ layer. In FIG. 10, it is shown as an example that the first layer (shown as Layer 1) and the second layer (shown as Layer 2) are convolutional layers, the $i^{th}$ layer (shown as Layer i) is a convolutional layer, and the $n^{th}$ layer (shown as Layer n) is a fully connected layer.

A block for each layer may include a line buffer, an XNOR logic gate, a pop-count instruction execution unit, and a batch-normalization performing unit. For example, the first block 110 for the first layer may include a line buffer 113, an XNOR logic gate 115, a pop-count instruction execution unit 115, and a batch-normalization performing unit 119.

The pixel values transferred from the previous layer are transferred to the line buffer of each block. For example, the line buffer 113 of the first block 110 transfers pixel values to the XNOR logic gate 115. Specifically, when a predetermined number of pixel values are loaded into the line buffer 113, the line buffer 1113 generates window values and transmits them to the XNOR logic gate 115.

The output of the XNOR logic gate 115 is transmitted to the pop-count instruction execution unit 117. The pop-count instruction execution unit 117 may perform accumulation by adding the results of the XNOR logic gate, performing multiplication 2 through bit shift, and then performing subtraction on the total number of bits (vec_len).

The batch-normalization performing unit 119 performs comparison with a threshold value.

Unlike the conventional artificial neural network accelerator (e.g., general NPU), which can process only one layer of artificial neural network, the dedicated BNN accelerator (i.e., dedicated BNN NPU) 100 presented in the present disclosure may implement the entire artificial neural network in hardware.

The dedicated BNN accelerator (i.e., dedicated BNN NPU) 100 presented in the present disclosure is based on a pipeline-type streaming architecture. That is, the dedicated BNN accelerator (i.e., the dedicated BNN NPU) 100 according to an embodiment of the present disclosure distributes a load generated while performing inference to layers. The number of pipelines is equal to the number of layers. Therefore, if pixels of the input image are continuously received, all layers can operate simultaneously processing the incoming stream of pixels, and very high performance can be achieved. Additionally, since the output of the previous layer is directly transferred to the next layer without intermediate storage, the transfer delay can be reduced, and the size of the required memory can be significantly reduced.

Meanwhile, since all layers are implemented with different hardware modules, input data can be continuously processed without interruption. If the number of layers increases, only the pipeline needs to be increased, so there may be no performance degradation. For example, if it is assumed that an image of size E*F is input, data of the input image may be transmitted every clock cycle. In this case, the dedicated BNN accelerator (i.e., the dedicated BNN NPU) 100 according to the embodiment of the present disclosure may complete the inference of classifying the image in only E*F clock cycles. As a result, the performance of the dedicated BNN accelerator (i.e., the dedicated BNN NPU) 100 according to the disclosure of the present specification can be flexibly increased according to the number of image pixels input every clock cycle. Specifically, blocks for each layer may be implemented under a pipeline scheme. To elaborate, the hardware module can be mass-produced as an ASIC after performance verification with FPGA.

As shown in FIG. 10, in order to evaluate the method described above, from the FPGA point of view, a BNN streaming architecture may be implemented. Specifically, the present disclosure presents a multi-layer architecture, in which each layer of a BNN is designed to be accelerated by an individual hardware block. In a coarse-grained pipeline scheme, a design of dividing the inference load into layers may be employed. In this pipelined scheme, the number of pipeline stages equals the number of layers.

Referring to FIG. 10, pipelining accompanied by a parallelization technique is effectively applied at the layer level. In general, a small-sized weighted line buffer is responsible for passing data between layers, while all multiplications and accumulations can be handled by a XNOR-pop count with a certain degree of parallelism. Binary weights, on the other hand, use much less memory than full precision weights, so all parameters can be stored entirely in registers in the FPGA. Designs using this approach can reduce power consumption, and time delays in data transfers from external memory and on-chip memory. In terms of hardware devices, the BNN architecture can be implemented on the Ultra96 evaluation board including the xczu3eg-sbva484-1-e Ultrascale+ MPSoC. Specifically, the process subsystem (PS) can be implemented with a quad-core Arm Cortex-A53 application processing unit and a dual-core Arm Cortex-R5 real-time processing unit. In the case of programmable logic (PL), it can be implemented with 141,120 flip-flops, 70,560 LUTs (lookup tables), 360 DSP slices, and 7.6 Mbits of block RAM. The register transfer level (RTL) design can be simulated in Synopsys VCS and then implemented in Vivado 2018.3. All experimental results describing the number of LUTS, number of flip-flops and expected power consumption can be recorded in Vivado's report. For the RRAM experiment, no physical RRAM device was used. Therefore, the RRAM simulator is implemented in PyTorch, and errors injected by the RRAM device can be replicated in the simulator. Based on the software simulator, it is possible to find a BNN model that performs best on a real RRAM device. For GPU experiments, the RTX 2080TI can be used. Finally, the training process for all experiments on that target platform can be performed on the GPU.

IV-1. Optimal BNN Search

Based on the basic design strategy and DeepBit technique described in Section III, this section describes the exploration process in an experiment performed using specific settings. In addition, the corresponding results are described to demonstrate the utility of the proposed method. Especially for FPGAs, the goal of an optimal BNN architecture is to achieve 98.4% accuracy performance with minimal hardware resources. Meanwhile, the goal of GPUs and RRAMs is simply to develop BNN architectures with maximum accuracy. As mentioned in the previous section, the DeepBit method receives three inputs as shown below.

L={3,4,5,6,7,8}
Maximum number of channels=50
Minimum accuracy threshold=98.4%

In the learning process, a combination of adaptive moment estimation (Adam) and stochastic gradient descent (SGD) optimizers can be applied. More specifically, the Adam optimizer can be used for the first 30 epochs, and then the SGD optimizer can be used for the remaining 70 epochs. The learning rate and momentum can be set to 0.03 and 0.5, respectively. Each learning can be performed 10 times for the first and second steps of the architecture exploration method. In the final stage, learning can be repeated a total of 100 times at the time of finding the final model. Six optimal BNN models corresponding to depths from 3 to 8 can be presented. Table 6 shows the configuration of the number of channels for each model. On the other hand, as mentioned in Section III, the layer module for the BNN model is shown in FIGS. 4A and 4B. Each module can contain convolution operations and batch-normalizations and hard-Tan h activation functions. In addition, the last two convolution layers additionally include a Max-pooling layer, and the last layer of any BNN model can always consist of a fully connected layer. Finally, the optimal number of channels for each layer of the BNN model can be found by the DeepBit architecture search method.

VI-2. Estimating Hardware Costs for Optimal Models

To estimate the hardware cost, based on the method described in Session IV, the most sensitive hardware resource (i.e., the hardware resources that make the big differences on the overall coast) is selected and estimated according to each hardware platform. In particular, in the case of an FPGA, a look-up table (LUT), flip flops, and power consumption may be selected to estimate the hardware cost. The range of network depth (i.e., number of layers) and number of channels is as follows:

L={3, 4, 5, 6, 7, 8}
C={5, 10, 15, 20, 25, 30}

Table 6 below shows the setting of the number of channels of the optimal BNNs found by the DeepBit method.

TABLE 6

| Layers | md1<br>3 Layers<br>Channels | md2<br>4 Layers<br>Channels | md3<br>5 Layers<br>Channels | md4<br>6 Layers<br>Channels | md5<br>7 Layers<br>Channels | md6<br>8 Layers<br>Channels |
|---|---|---|---|---|---|---|
| 1 | 26 | 23 | 20 | 19 | 11 | 8 |
| 2 | 24 | 21 | 21 | 19 | 9 | 15 |
| 3 | 31 | 22 | 21 | 14 | 20 | 17 |
| 4 |  | 21 | 21 | 16 | 15 | 17 |
| 5 |  |  | 20 | 18 | 20 | 17 |
| 6 |  |  |  | 19 | 20 | 10 |
| 7 |  |  |  |  | 20 | 17 |
| 8 |  |  |  |  |  | 17 |
| MAC OPs | 5989368 | 7756896 | 10206896 | 8916432 | 9964640 | 9854684 |

All possible models with the depth (i.e., the number of layers) and the number of channels defined by the sets L and C can be initialized with arbitrary weight values. These models can then be physically tested on that target hardware platform. Based on the implemented results, a hardware estimation chart for the search method can be created. In Tables 7 to 9, cost estimation charts based on the look-up table, flip-flops, and power consumption may be provided for the FPGA platform. Specifically, the actual hardware cost for various models with a width interval of 5 channels can be prepared in advance. As described in the previous section, since each model has a uniform number of channels (i.e., width) for each layer, in the cost estimation chart, the average number of channels per layer (i.e., width) can be considered as the number of uniform channels (i.e., width) of the optimal BNN model. The actual hardware cost for the optimal model can be found by the number of uniform channels (i.e., width) and the number of layers in the hardware cost estimation chart. In this case, if the optimal number of channels (i.e., width) is not in the estimation chart, linear interpolation can be applied to estimate the hardware cost of the optimal model. For example, as shown in Table 6, an optimal model of three layers can be used.

Table 7 below shows the LUT estimation chart.

TABLE 7

|  | 3 | 4 | 5 | 6 | 7 | 8 | 9 | 10 | ↑ |
|---|---|---|---|---|---|---|---|---|---|
| 10 |  |  |  | 9192 | 10329 | 11935 | 12381 | 13259 | ↑ |
| 15 |  | 11003 | 13340 | 15546 | 17823 | 20058 | 22268 | 24592 | Channel |
| 20 | 12648 | 16230 | 19387 | 23299 | 26911 | 31188 | 38827 | 43374 | (C) |
| 25 | 16845 | 22801 | 29206 | 38535 | 45095 |  |  |  | ↓ |
| 30 | 25465 | 35192 |  |  |  |  |  |  | ↓ |
|  |  |  |  | ←Layer (L)→ |  |  |  |  |  |

Table 8 below shows a flip-flop estimation chart.

TABLE 8

|  | 3 | 4 | 5 | 6 | 7 | 8 | 9 | 10 | ↑ |
|---|---|---|---|---|---|---|---|---|---|
| 10 |  |  |  | 6037 | 6732 | 7862 | 8590 | 8859 | ↑ |
| 15 |  | 7076 | 8288 | 9511 | 10755 | 11551 | 12720 | 13975 | Channel |
| 20 | 7449 | 9157 | 10483 | 12258 | 13987 | 16231 | 17553 | 19777 | (C) |
| 25 | 8723 | 11123 | 13970 | 16379 | 18788 |  |  |  | ↓ |
| 30 | 11296 | 14528 |  |  |  |  |  |  | ↓ |
|  |  |  |  | ← Layer (L)→ |  |  |  |  |  |

Table 9 below shows a power consumption estimation chart.

TABLE 9

|  | 3 | 4 | 5 | 6 | 7 | 8 | 9 | 10 | ↑ |
|---|---|---|---|---|---|---|---|---|---|
| 10 |  |  |  | 0.611 | 0.676 | 0.74 | 0.791 | 0.836 | ↑ |
| 15 |  | 0.721 | 0.877 | 0.985 | 1.127 | 1.26 | 1.422 | 1.561 | Channel |
| 20 | 0.77 | 1.053 | 1.281 | 1.494 | 1.718 | 1.983 | 2.251 | 2.499 | (C) |
| 25 | 0.966 | 1.117 | 1.692 | 2.143 | 2.525 |  |  |  | ↓ |
| 30 | 1.429 | 2.079 |  |  |  |  |  |  | ↓ |
|  |  |  |  | ← Layer (L)→ |  |  |  |  |  |

The average width per layer of the model may be 27. For a BNN model with 25 channels per layer, the cost estimate chart shows the hardware cost C1, and for a BNN model with 30 channels per layer, the cost estimate chart shows the hardware cost C2. Finally, the hardware cost of the model (C_est) can be estimated by linear interpolation as shown in the following formula:

$$C_{est} = \left[\frac{(\text{average} - \text{lower\_estimate})}{(\text{higher\_estimate} - \text{lower\_estimate})} * (C2 - C1)\right] + C1 \quad \text{[Equation 8]}$$

Table 12 shows the hardware cost of the optimal BNN model found by the estimation method. Thus, a model with four layers consumes the least number of LUTs (18,764) and energy (1.151), whereas a model with three layers can consume the least number of flip-flops. Comparing the number of MAC operations between the optimal models, it can be concluded that the model with the least MAC operations may or may not be optimal for hardware implementation in FPGAs. Therefore, estimating the actual hardware cost for a software model is really important in exploring the best model to implement on a particular target platform.

When it comes to GPU and RRAM devices, the only goal of architecture discovery in the experimental scope is accuracy. Therefore, the optimal BNN model with maximum accuracy can be the output of architecture search for GPU and RRAM. Specifically, the accuracy chart for the GPU is shown in Table 10. Unlike other devices, the computational cost of GPU may vary depending on the number of MAC operations. Therefore, the optimal BNN model will have the lowest number of MAC operations and the highest accuracy. According to the results, when the number of channels exceeds 40 and the number of layers is more than 5, the accuracy tends to be saturated. That is, according to an experiment, it can be seen that an increase in the number of channels or layers (increasing MAC operation) does not always increase accuracy, but may burden the calculation. Experiments show that the optimal BNN model for GPU is a model with 6 convolutional layers and 50 output channels, which provides the highest accuracy (98.88%) and optimal number of MAC operations.

In the case of an RRAM device, a simulator may be prepared to emulate the operating mechanism of the RRAM. Here, errors due to I/R drop and white noise are injected into the simulator. Theoretically, the greater the number of channels in the convolutional layer implemented in the RRAM device, the greater the error may occur. Simulation is performed using this characteristic, and accuracy estimation for the RRAM device can be arranged as shown in Table 11. Therefore, even if the effect of RRAM errors is negligible, 10 channels may not be sufficient to provide high accuracy. On the other hand, since the 50-channel model has a large effect of error, accuracy may not be improved even if the number of channels per layer is too large. As a result of the experiment, the model consisting of 7 layers and 30 channels showed the best performance with 98.45%, which is considered the best candidate for RRAM-based devices.

Table 10 below shows the GPU accuracy estimation chart.

TABLE 10

| | 3 | 4 | 5 | 6 | 7 | 8 | 9 | 10 | ↑ |
|---|---|---|---|---|---|---|---|---|---|
| 5 | 89.79 | 91.87 | 92.14 | 91.61 | 93.07 | 94.09 | 93.69 | 93.41 | ↑ |
| 10 | 95.46 | 96.23 | 96.66 | 96.97 | 96.86 | 97.09 | 97.57 | 97.29 | ↑ |
| 15 | 96.61 | 97.46 | 97.56 | 98.01 | 97.95 | 97.91 | 98.19 | 98.15 | ↑ |
| 20 | 97.72 | 97.85 | 98.05 | 98.25 | 98.44 | 98.32 | 98.24 | 98.47 | ↑ |
| 25 | 97.85 | 98.33 | 98.37 | 98.35 | 98.51 | 98.44 | 98.7 | 98.4 | Channel |
| 30 | 98.15 | 98.34 | 98.48 | 98.59 | 98.55 | 98.57 | 98.71 | 98.62 | (C) |
| 35 | 98.45 | 98.44 | 98.38 | 98.6 | 98.65 | 98.82 | 98.7 | 98.6 | ↓ |
| 40 | 98.49 | 98.57 | 98.74 | 98.71 | 98.7 | 98.83 | 98.64 | 98.75 | ↓ |
| 45 | 98.4 | 98.48 | 98.68 | 98.76 | 98.85 | 98.8 | 98.78 | 98.86 | ↓ |
| 50 | 98.47 | 98.48 | 98.82 | 98.88 | 98.84 | 98.75 | 98.84 | 98.88 | ↓ |
| | ← Layer (L)→ | | | | | | | | |

Table 11 below shows the RRAM accuracy estimation chart.

TABLE 11

| | 3 | 4 | 5 | 6 | 7 | 8 | 9 | 10 | ↑ |
|---|---|---|---|---|---|---|---|---|---|
| 10 | 95.43 | 95.33 | 96.2 | 96.52 | 96.25 | 96.39 | 97.14 | 96.96 | Channel |
| 30 | 97.38 | 98.07 | 97.72 | 98.15 | 98.45 | 97.78 | 98.37 | 98.24 | (C) |
| 50 | 96.93 | 97.78 | 97.86 | 97.34 | 97.94 | 95.63 | 97.61 | 96.92 | ↓ |
| | ← Layer (L)→ | | | | | | | | |

VI-3. Analysis of Experimental Results

The optimal model selected may vary according to the target cost estimate. In the case of FPGA, as shown in Table 12, the model with three layers has the least flip-flops, while the model with four layers has the fewest lookup tables and consumes the least power. If power consumption is regarded as the most important resource, a model having four layers may be selected as an optimal candidate.

Table 13 shows the actual hardware cost for the best model.

Comparing the hardware cost of the selected model with md1, which has the smallest MAC operation, it can be seen that the method proposed in the present disclosure can reduce power consumption of the target hardware compared to using the MAC operation. Also, according to Table 12, it can be seen that the estimation method provides reasonable data related to the hardware cost compared to the actual hardware overhead. Therefore, when applying the proposed method to complex networks and data sets, it is possible to significantly optimize the network design for the critical cost. For example, according to the experiment of the present disclosure, the model md4 with 6 convolutional layers has almost 1.5 times more MAC operations than the model with 3 layers, but exhibits similar hardware statistics as the model with 3 layers. This proves that the MAC operation is misleading and thus is not a good estimate of actual hardware performance.

Table 12 below shows the hardware cost estimates for the optimal BNN model.

TABLE 12

| Model | Layers | LUTS | Flip Flops | Power | Mac Ops |
|---|---|---|---|---|---|
| md1 | 3 | 20293 | 9752.2 | 1.1512 | 5989368 |
| md2 | 4 | 18764 | 10000.5 | 1.151 | 7756896 |
| md3 | 5 | 20565 | 10901 | 1.33 | 10206896 |
| md4 | 6 | 19422 | 10884.5 | 1.2395 | 8916432 |
| md5 | 7 | 20422.17 | 11679 | 1.296 | 9964640 |
| md6 | 8 | 19651 | 11366 | 1.234 | 9854684 |

Table 13 below compares the actual hardware performance and MAC operation for various models.

TABLE 13

| Model | Layers (#) | LUTs | Flip Flops | Power | MAC Ops |
|---|---|---|---|---|---|
| md1 | 3 | 19211 | 9104 | 1.126 | 5989368 |
| md2 | 4 | 20692 | 10082 | 1.123 | 14652176 |
| md4 | 6 | 21410 | 10936 | 1.256 | 8916432 |

Finally, for various target hardware, the optimal BNN model searched according to the example of the present disclosure is shown in Table 14. This may be an optimal network for all hardware using generalized metrics such as FLOP or MAC operations. Each piece of hardware may have different critical resources. Hardware-specific metrics are required to find the optimal model for the target hardware.

Table 14 below shows the optimal BNN model for different hardware.

TABLE 14

|  | Layers | Width Configuration | Accuracy on Target Device (%) |
|---|---|---|---|
| FPGA | 4 | 23-21-22-21 | 98.37 |
| RRAM | 7 | 30-30-30-30-30-30-30 | 98.45 |
| GPU | 6 | 50-50-50-50-50-50 | 98.88 |

VII. Conclusion

Optimizing the DNN model for hardware implementation has been a challenge, especially for applications with resource-constrained embedded environments. BNNs can greatly simplify neural network models, but they suffer from reduced accuracy when binarizing weights and activations. Using an optimal accelerator and optimizing based on generalized metrics and accuracy such as FLOP and MAC operations are popular methods applicable to most neural network models. However, since each hardware platform has different characteristics, it is challenging to find an optimal model for hardware implementation only by evaluating at the software level.

Therefore, the present disclosure successfully presented a feasible architecture search method (DeepBit) including a learning strategy and hardware cost estimation technique to explore the final optimal BNN model for a specific hardware platform. In general, the DeepBit algorithm allows a BNN designer to speedup the search process by narrowing the search space. On the other hand, compared with independent optimization at the software level, based on critical hardware resources, hardware cost estimation can be inputted with a list of BNN models, which can help to select a better optimal BNN model for a specific hardware platform. To sum up, the presented DeepBit for DNN set up a feasible and practical foundation on which further improvement can be made to make the solution more comprehensive and practical.

VIII. Summary of Examples of the Present Disclosure

Figure 11:
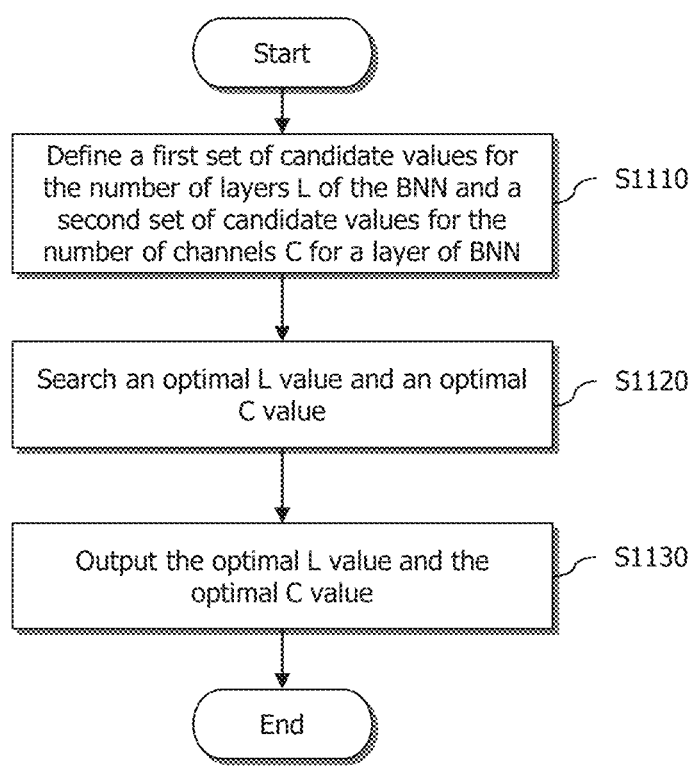
FIG. 11 is a schematic flowchart illustrating an operation of a computer-implemented apparatus according to an example.

FIG. 11 is schematic flowchart illustrating an operation of a computer-implemented apparatus according to one embodiment.

According to the embodiment of the present disclosure, in order to find an optimal design of a binarized neural network (BNN) and a neural processing unit (NPU) for driving the corresponding BNN, a computer-implemented apparatus installed and executed in a computer is presented.

First, according to the computer-implemented apparatus, a first set of candidate values for the number of layers L of the BNN and a second set of candidate values for the number of channels C for each layer may be defined S1110.

Next, according to the computer-implemented apparatus, an optimal L value and an optimal C value may be searched S1120.

Then, the optimal L value and the optimal C value may be output by the computer-implemented apparatus S1130.

When the NPU includes a plurality of blocks connected in a pipeline form, the number of the plurality of blocks may be related to the optimal L value.

Each of the plurality of blocks may include at least one of a line buffer, an XNOR logic gate, a pop-count instruction execution unit, and a batch-normalization unit.

In the step S1120, the optimal L value and the optimal C value may be searched based on at least one of a hardware cost of the NPU and a power consumption of the NPU.

The hardware cost of the NPU may be determined based on the number of flip-flops.

In step S1120, the optimal L value and the optimal C value may be searched based on a minimum required accuracy.

In this case, when accuracy degradation occurs, the optimal C value may be increased by one or two steps.

The optimal C value may be the same constant value in all layers of the BNN.

Figure 12:
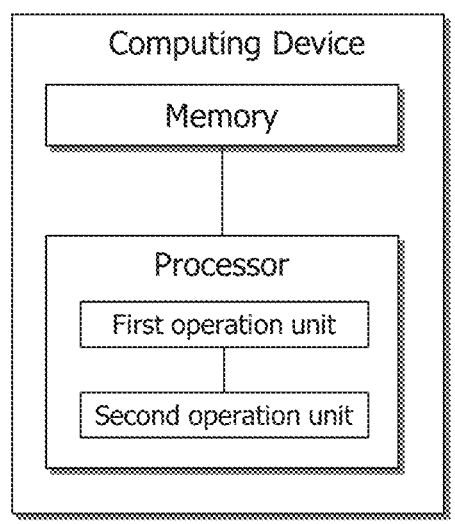
FIG. 12 is a schematic block diagram of a computer device according to an example of the present disclosure.

FIG. 12 is a block diagram of a computing apparatus according to an example of the present disclosure.

Referring to FIG. 12, a computing apparatus is provided according to an example of the present disclosure. The computing apparatus may drive a computer-implemented apparatus for finding an optimal design of a binarized neural network (BNN) and a neural processing unit (NPU) for driving the BNN.

The computing apparatus may include a memory and a processor (a CPU or a GPU, or a number of CPUs or a number of GPUs).

The memory may include read-only memory (ROM), random access memory (RAM), flash memory, memory cards, storage media, and/or other storage devices.

The memory may store instructions for a computer-implemented apparatus that finds a binarized neural network (BNN) and an optimal design of a neural processing unit (NPU) for driving the BNN.

The processor may include a first operation unit and a second operation unit by executing the instruction.

If a first set of candidate values for the number L of layers of the BNN and a second set of candidate values for the number C of channels per each layer is provided, the first operation unit may search for an optimal L value and an optimal C value.

The second operation unit's operations may include outputting the optimal L value and the optimal C value.

When the NPU includes a plurality of blocks connected in a pipeline form, the number of the plurality of blocks may be related to the optimal L value.

Each of the plurality of blocks may include at least one of a line buffer, an XNOR logic gate, a pop-count instruction execution unit, and a batch-normalization unit.

The first operation unit may search for the optimal L value and the optimal C value based on at least one of a hardware cost of the NPU and a power consumption of the NPU.

The hardware cost of the NPU may be determined based on the number of flip-flops.

The first operation unit may search for the optimal L value and the optimal C value based on a minimum required accuracy. In this case, if accuracy degradation occurs, the optimal C value may be increased by one or two steps.

The optimal C value may be the same constant value in all layers of the BNN.

On the other hand, the NPU for the BNN found by the above computer-implemented apparatus may be as follows.

Specifically, the NPU may include a plurality of blocks. The plurality of blocks may be connected in a pipeline form. Each of the plurality of blocks may include at least one of a line buffer, an XNOR logic gate, a pop-count instruction execution unit, and a batch-normalization unit.

The number of the plurality of blocks may be equal to the number L of the plurality of layers in the BNN. The number L of the plurality of layers and the number C of channels per layer may be determined based on power consumption and hardware implementation cost.

The optimal NPU found by the computer-implemented apparatus may be implemented primarily as an FPGA. Thereafter, the FPGA implemented as the FPGA may be implemented as an ASIC in order to increase performance.

Since the optimal BNN found according to the example of the present disclosure has low power consumption, it may be used for a handheld device requiring always-on AI function. In addition, since the optimal NPU found according to the example of the present disclosure has low power consumption, it may be mounted on a handheld device to provide an always-on AI function. The examples of the present disclosure disclosed in the present disclosure and the drawings merely provide a specific example for easy description and better understanding of the technical description of the present disclosure, but are not intended to limit the scope of the present disclosure. It will be apparent to those of ordinary skilled in the art to which the present disclosure pertains that other modified examples based on the technical spirit of the disclosure can be implemented in addition to the examples disclosed herein.

[National R&D Project Supporting This Invention]
[Task Identification Number] 1711170668
[Task Number] 2022-0-00248-001
[Name of Ministry] Ministry of Science and ICT
[Name of Project Management (Specialized) Institution] Institute of Information & Communications Technology Planning & Evaluation
[Research Project Title] Development of Core Technology for PIM Artificial Intelligence Semiconductor (Design)
[Research Task Title] Development of CXL-based PIM semiconductor technology for multiple DRAM modules considering memory consistency
[Contribution Rate]1/1
[Name of Organization Performing the Task] DeepX Co., Ltd.
[Research period15 minutes] 2022-04-01-2022-12-31

What is claimed is:

1. A computer-implemented apparatus configured to search an optimal design of a binarized neural network (BNN) to be operated by a neural processing unit (NPU), the computer-implemented apparatus comprising:
a first operation unit configured to search for an optimal L value and an optimal C value with respect to the BNN, which of all weight parameters are binarized, when a first set of candidate values for a number of layers L and a second set of candidate values for a number of channels C per each layer of the BNN are provided; and
a second operation unit configured to output the optimal L value and the optimal C value,
wherein when the NPU includes a plurality of blocks connected in a form of pipeline, a number of the plurality of blocks is related to the optimal L value.

2. The computer-implemented apparatus of claim 1, wherein each of the plurality of blocks includes at least one of a line buffer, a XNOR logic gate, a pop-count instruction execution unit, and a batch-normalization unit.

3. The computer-implemented apparatus of claim 1, wherein the first operation unit is configured to search for the optimal L value and the optimal C value based on at least one of a hardware cost of the NPU and a power consumption of the NPU.

4. The computer-implemented apparatus of claim 3, wherein the hardware cost of the NPU is determined based on a number of flip-flops.

5. The computer-implemented apparatus of claim 1, wherein the first operation unit is configured to search for the optimal L value and the optimal C value based on a required minimum inference accuracy.

6. The computer-implemented apparatus of claim 5, wherein the optimal C value is increased by one or two steps when inference accuracy degradation occurs.

7. The computer-implemented apparatus of claim 1, wherein the optimal C value is a constant value that is the same in all layers of the BNN.

8. A computing system comprising:
at least one processor; and
at least one memory, operably electrically connected to the at least one processor, configured to store an instruction to search an optimal design of a binarized neural network (BNN) to be operated by a neural processing unit (NPU),
wherein an operation, configured to be performed based on the instructions for the computer-implemented apparatus being executed by the at least one processor, comprising:
searching for an optimal L value and an optimal C value with respect to the BNN, which of all weight parameters are binarized, when a first set of candidate values for a number of layers L and a second set of candidate values for a number of channels C per each layer of the BNN are provided; and
outputting the optimal L value and the optimal C value,
wherein when the NPU includes a plurality of blocks connected in a form of pipeline, a number of the plurality of blocks is related to the optimal L value.

9. The computing system of claim 8,
wherein each of the plurality of blocks includes at least one of a line buffer, a XNOR logic gate, a pop-count instruction execution unit, and a batch-normalization unit.

10. The computing system of claim 8,
wherein the searching for the optimal L value and the optimal C value is conducted based on at least one of a hardware cost of the NPU and a power consumption of the NPU.

11. The computing system of claim 10,
wherein the hardware cost of the NPU is determined based on a number of flip-flops.

12. The computing system of claim 8,
wherein the searching for the optimal L value and the optimal C value is conducted-based on a required minimum inference accuracy.

13. The computing system of claim 12,
wherein the optimal C value is increased by one or two steps when inference accuracy degradation occurs.

14. The computing system of claim 8,
wherein the optimal C value is a constant value that is the same in all layers of the BNN.

15. A non-transitory computer-readable storage medium storing instructions for a computer-implemented apparatus that searches an optimal design of a binarized neural network (BNN) to be operated by a neural processing unit (NPU), the computer readable storage medium is configured to store the instructions,
wherein the instructions, when executed by at least one processor, cause the at least one processor to:
search for an optimal L value and an optimal C value with respect to the BNN, which of all weight parameters are binarized, when a first set of candidate values for a number of layers L and a second set of candidate values for a number of channels C per each layer of the BNN are provided; and output the optimal L value and the optimal C value,
wherein when the NPU includes a plurality of blocks connected in a form of pipeline, a number of the plurality of blocks is related to the optimal L value.

16. The computer readable storage medium of claim 15, wherein each of the plurality of blocks includes at least one of a line buffer, a XNOR logic gate, a pop-count instruction execution unit, and a batch-normalization unit.

17. The computer readable storage medium of claim 15, wherein the searching for the optimal L value and the optimal C value is based on at least one of a hardware cost of the NPU and a power consumption of the NPU.

18. The computer readable storage medium of claim 15, wherein the hardware cost of the NPU is determined based on a number of flip-flops.

19. The computer readable storage medium of claim 15, wherein the searching for the optimal L value and the optimal C value is based on a required minimum inference accuracy.

20. A neural processing unit (NPU) configured to operate a binarized neural network (BNN), the NPU comprising:

a plurality of blocks, wherein the plurality of blocks is connected in a form of pipeline, wherein each of the plurality of blocks includes at least one of a line buffer, a XNOR logic gate, a pop-count instruction execution unit, and a batch-normalization unit, wherein a number of the plurality of blocks is equal to a number L of a plurality of layers in the BNN, which of all weight parameters are binarized, and wherein, the number L of the plurality of layers and a number C of channels per layer are determined based on a power consumption and a hardware implementation cost.

* * * * *